United States Patent [19]
Sakai

[11] Patent Number: 5,848,278
[45] Date of Patent: Dec. 8, 1998

[54] SERIAL INTERRRUPT CONTROL SYSTEM IN A SYSTEM IN WHICH A PLURALITY OF INTERRUPT REQUESTERS ARE CONNECTED TO A SERIAL BUS

[75] Inventor: Makoto Sakai, Tokyo, Japan

[73] Assignee: Kabushiki Kaisha Toshiba, Kawasaki, Japan

[21] Appl. No.: 719,215

[22] Filed: Sep. 25, 1996

[30] Foreign Application Priority Data

Sep. 29, 1995 [JP] Japan ................................ 7-253266

[51] Int. Cl.⁶ ........................................................ G06F 9/46
[52] U.S. Cl. ............................ 395/733; 395/740; 395/551
[58] Field of Search ................................... 395/740, 739, 395/868, 734, 185.03, 555, 859, 551, 559, 733–742

[56] References Cited

U.S. PATENT DOCUMENTS

| | | | |
|---|---|---|---|
| 5,261,107 | 11/1993 | Klim et al. ............................ | 395/725 |
| 5,510,787 | 4/1996 | Koster ................................... | 341/76 |
| 5,535,420 | 7/1996 | Kardach et al. ...................... | 395/868 |
| 5,568,649 | 10/1996 | MacDonald et al. ................ | 395/868 |
| 5,572,043 | 11/1996 | Suzuki .................................. | 395/737 |
| 5,613,126 | 3/1997 | Schmidt ................................ | 395/733 |
| 5,619,703 | 4/1997 | Omid et al. .......................... | 395/734 |
| 5,634,069 | 5/1997 | Hicok et al. ......................... | 395/800 |
| 5,664,197 | 9/1997 | Kardach et al. ..................... | 395/728 |
| 5,671,421 | 9/1997 | Kardach et al. ..................... | 395/733 |
| 5,692,200 | 11/1997 | Carlson et al. ...................... | 395/735 |

FOREIGN PATENT DOCUMENTS

07084691 A   3/1995   Japan .

*Primary Examiner*—Meng-Ai T. An
*Assistant Examiner*—Harold J. Kim
*Attorney, Agent, or Firm*—Finnegan, Henderson, Farabow, Garrett & Dunner, L.L.P.

[57] ABSTRACT

In an interrupt control system to be applied, especially, to a laptop or notebook type personal computer that can use an expansion unit, an interrupt encoder converts the leading edges of a plurality of interrupt signals into serial data and transfers the serial data to an interrupt decoder. The interrupt decoder converts the serial data into original parallel interrupt signals, and outputs these signals to a programmable interrupt controller. A bridge circuit generates an idle cycle of a secondary bus by detecting the idle cycle of a primary bus, and generates latch pulses for interrupt serial data of the secondary bus.

41 Claims, 22 Drawing Sheets

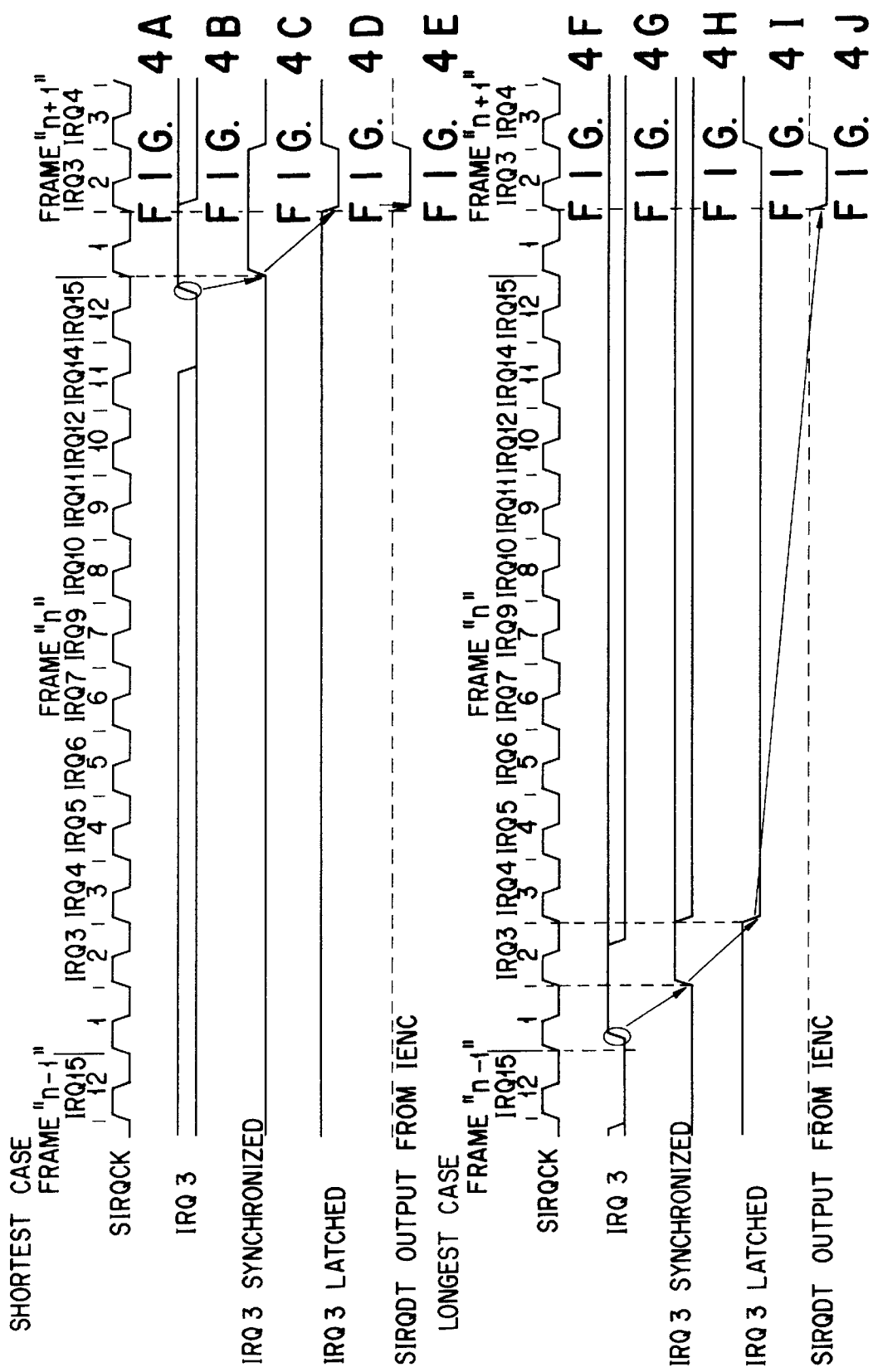

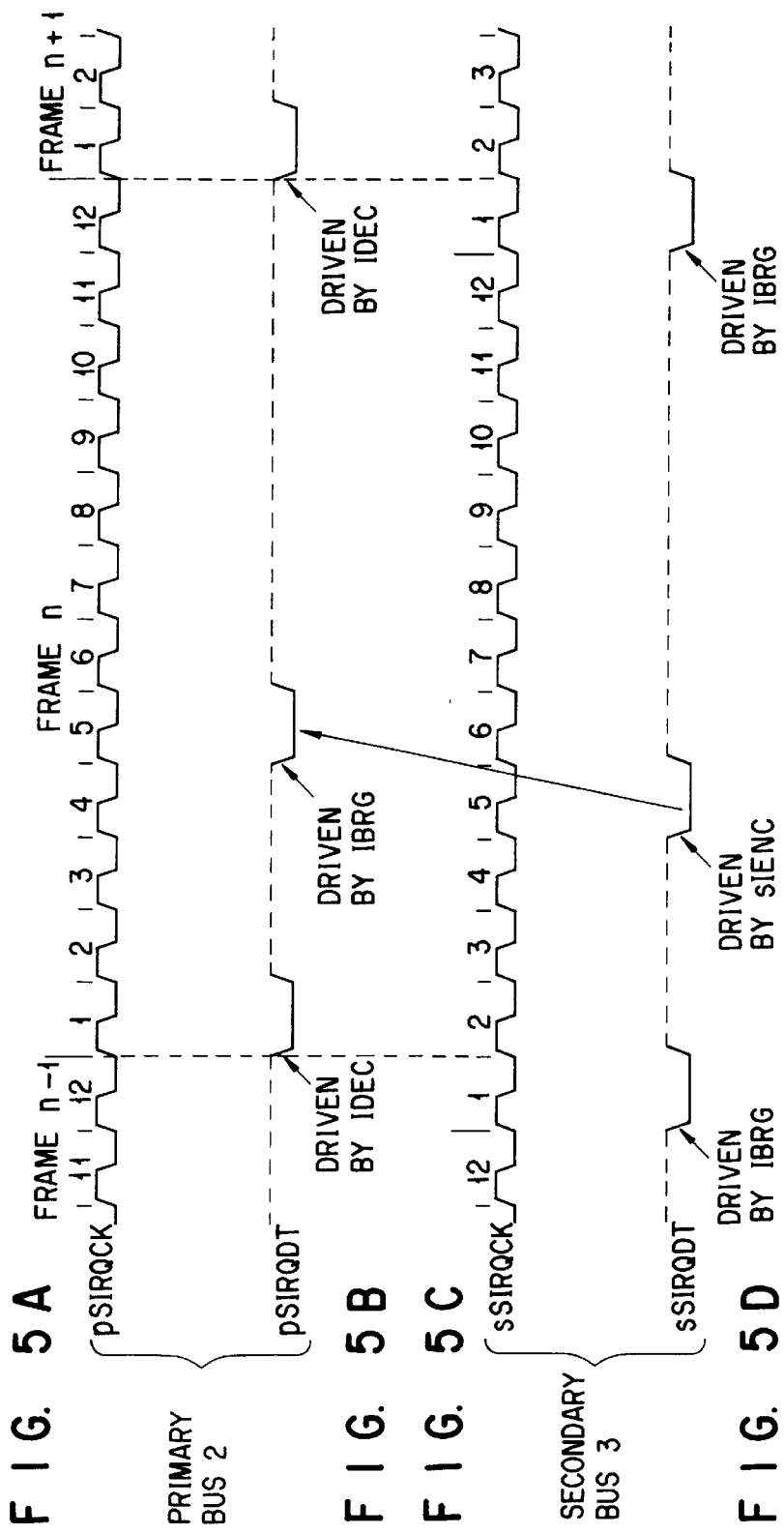

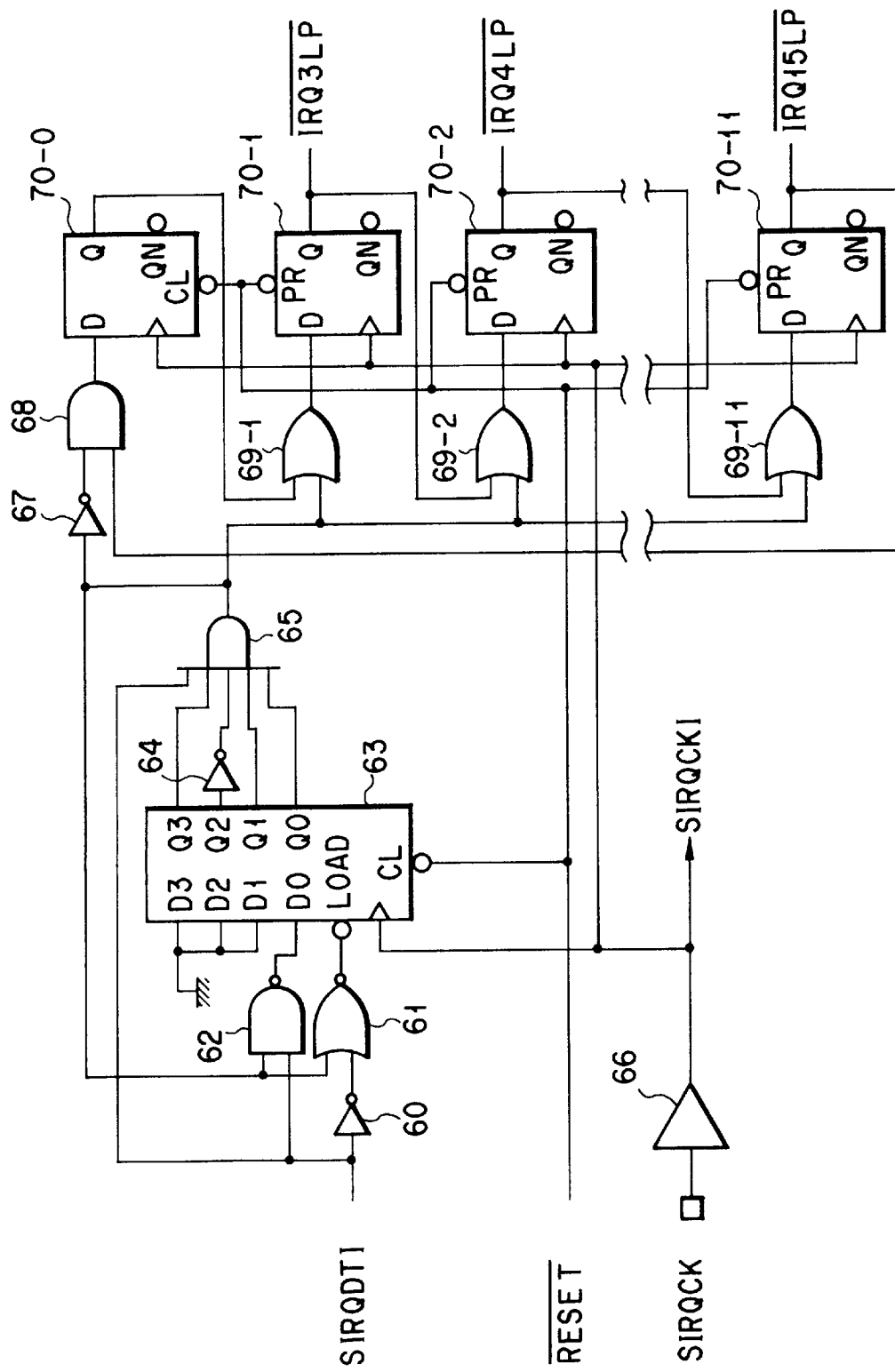
F I G. 6

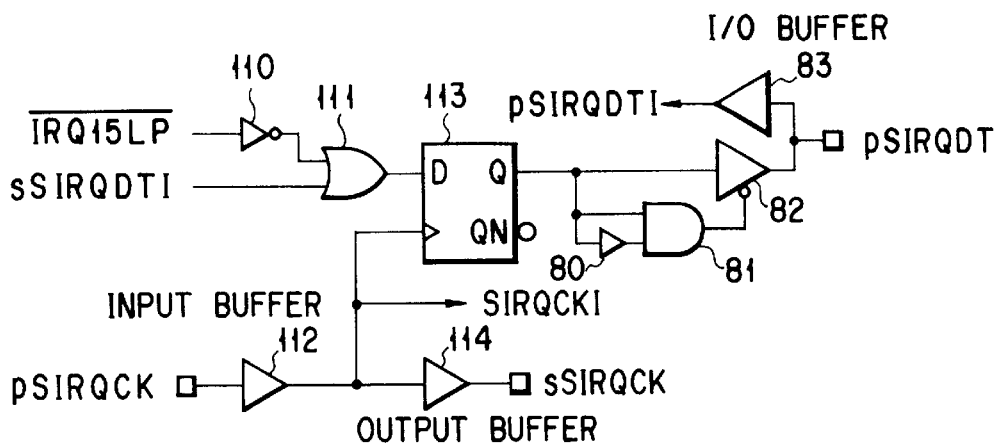
FIG. 11
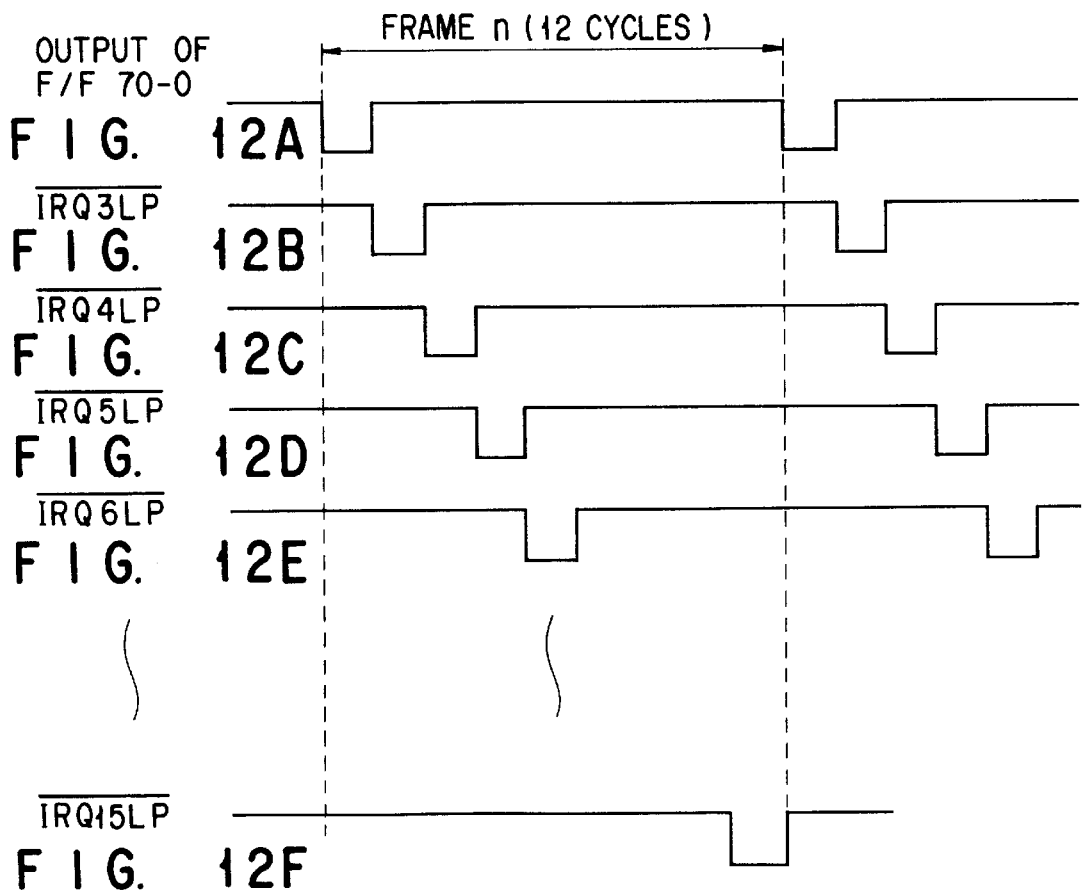
FIG. 12A
FIG. 12B
FIG. 12C
FIG. 12D
FIG. 12E
FIG. 12F

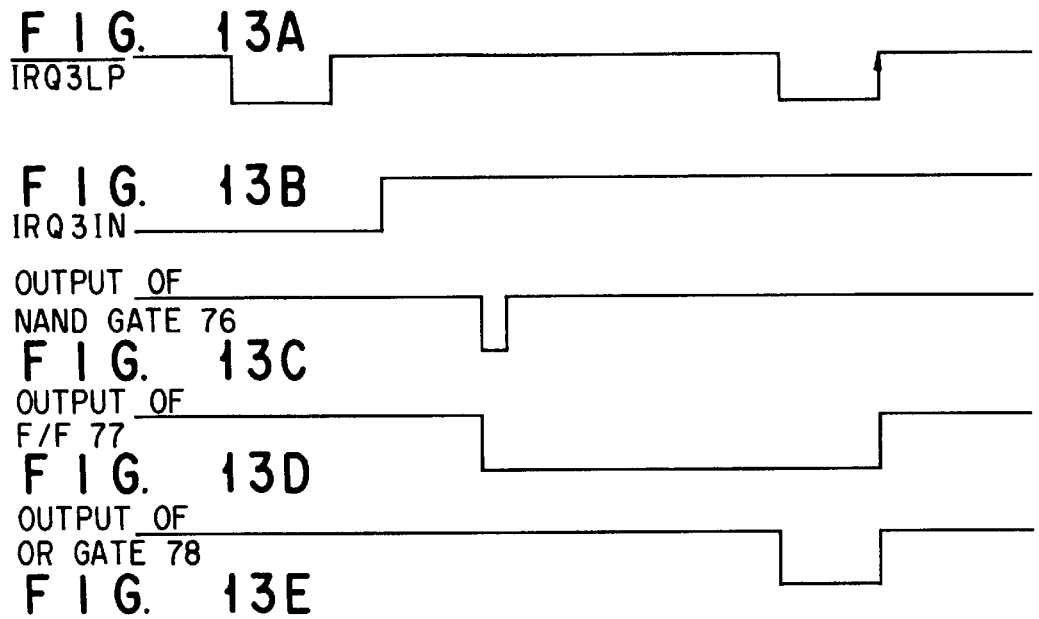
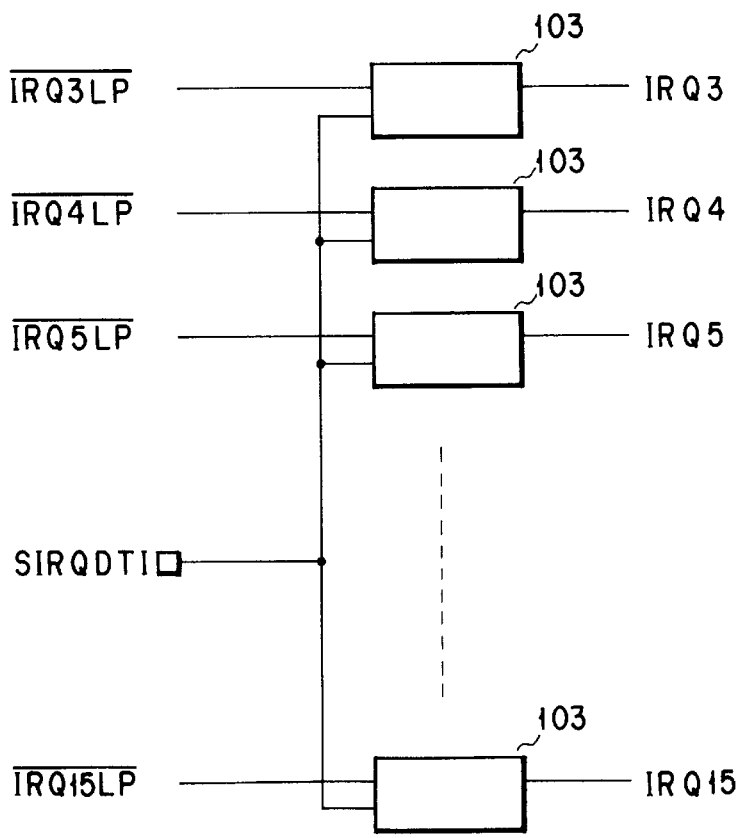
FIG. 14

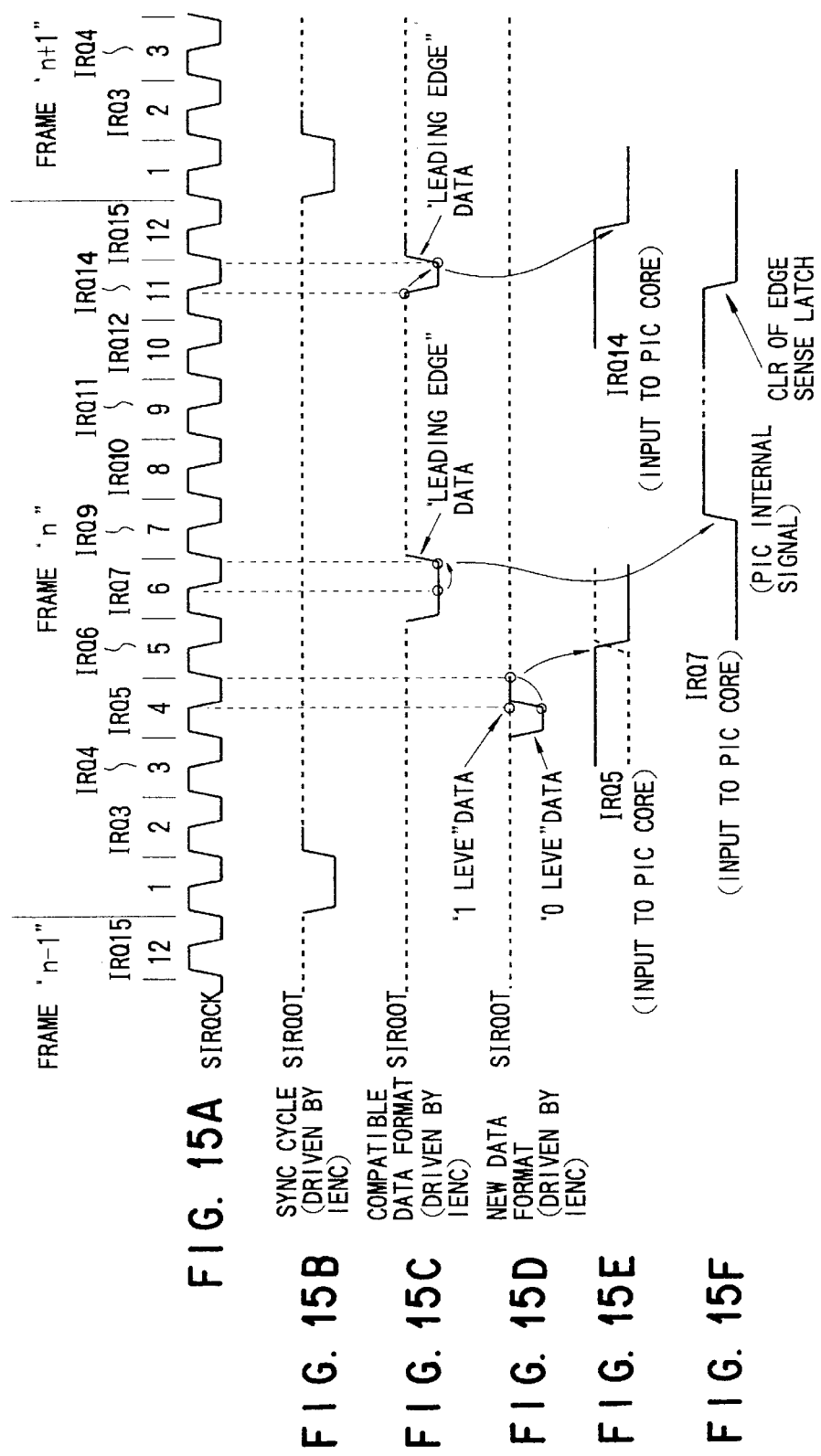

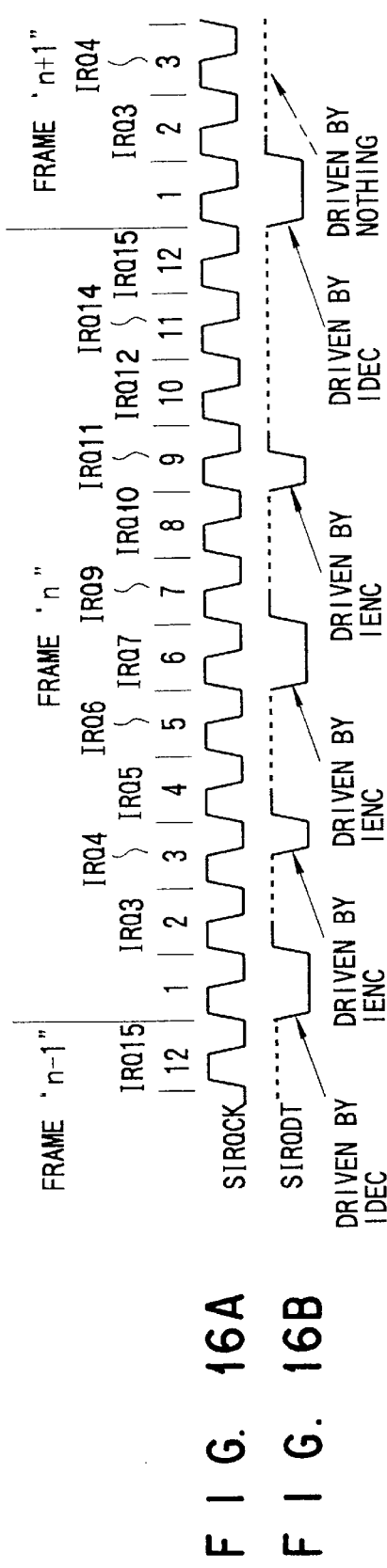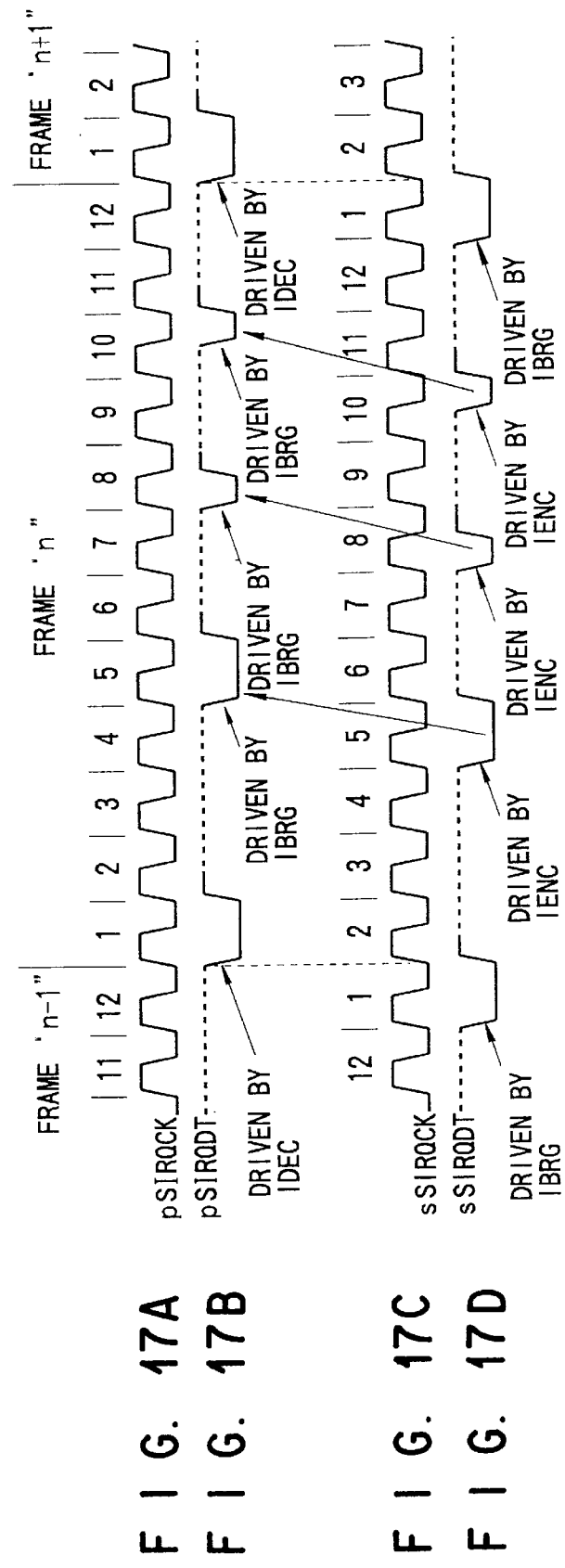

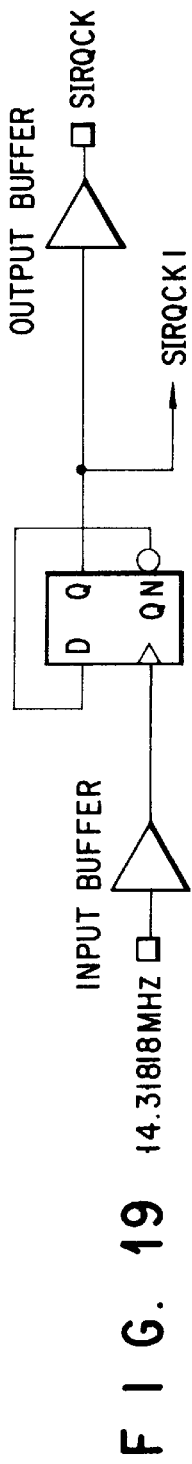
F I G. 19
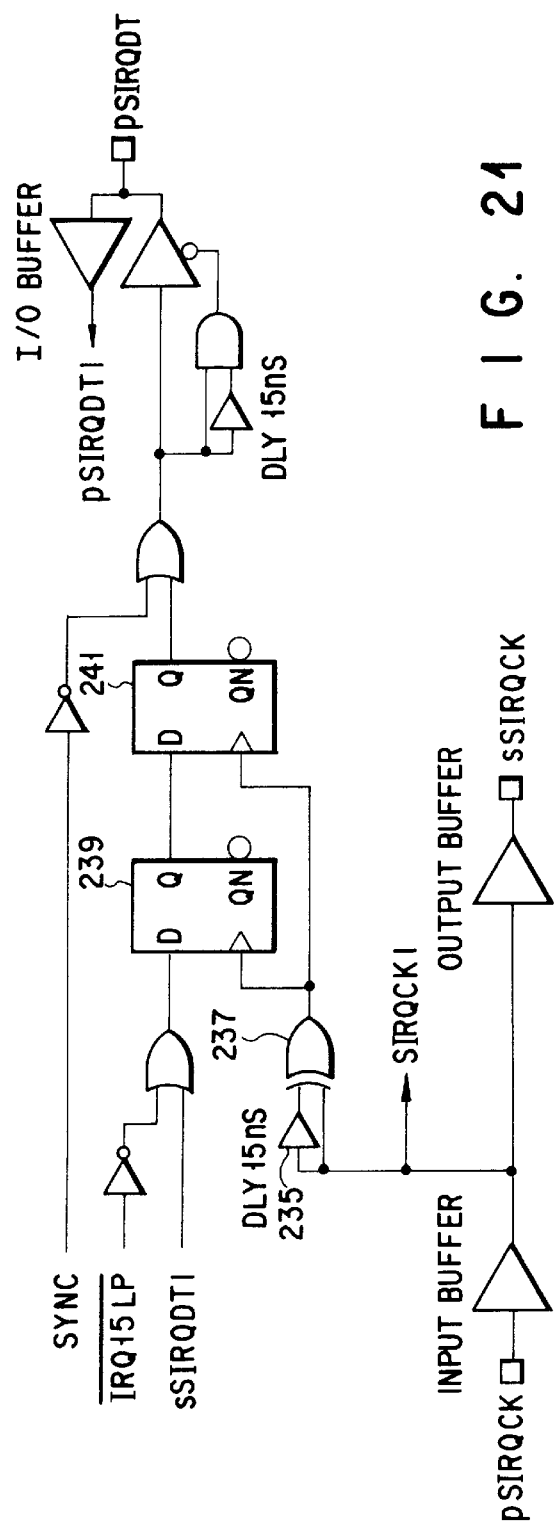
F I G. 21

| SIRQDT | | FUNCTION | |
|---|---|---|---|
| FORMER | LATTER | EDGE MODE | LEVEL MODE |
| Hi-Z | Hi-Z | NO CHANGE | "1" LEVEL |
| LOW | Hi-Z | — | "0" LEVEL |
| Hi-Z | LOW | TRAILING EDGE | — |
| LOW | LOW | TRAILING EDGE (OR SYNC DATA) | SYNC DATA |

FIG. 22

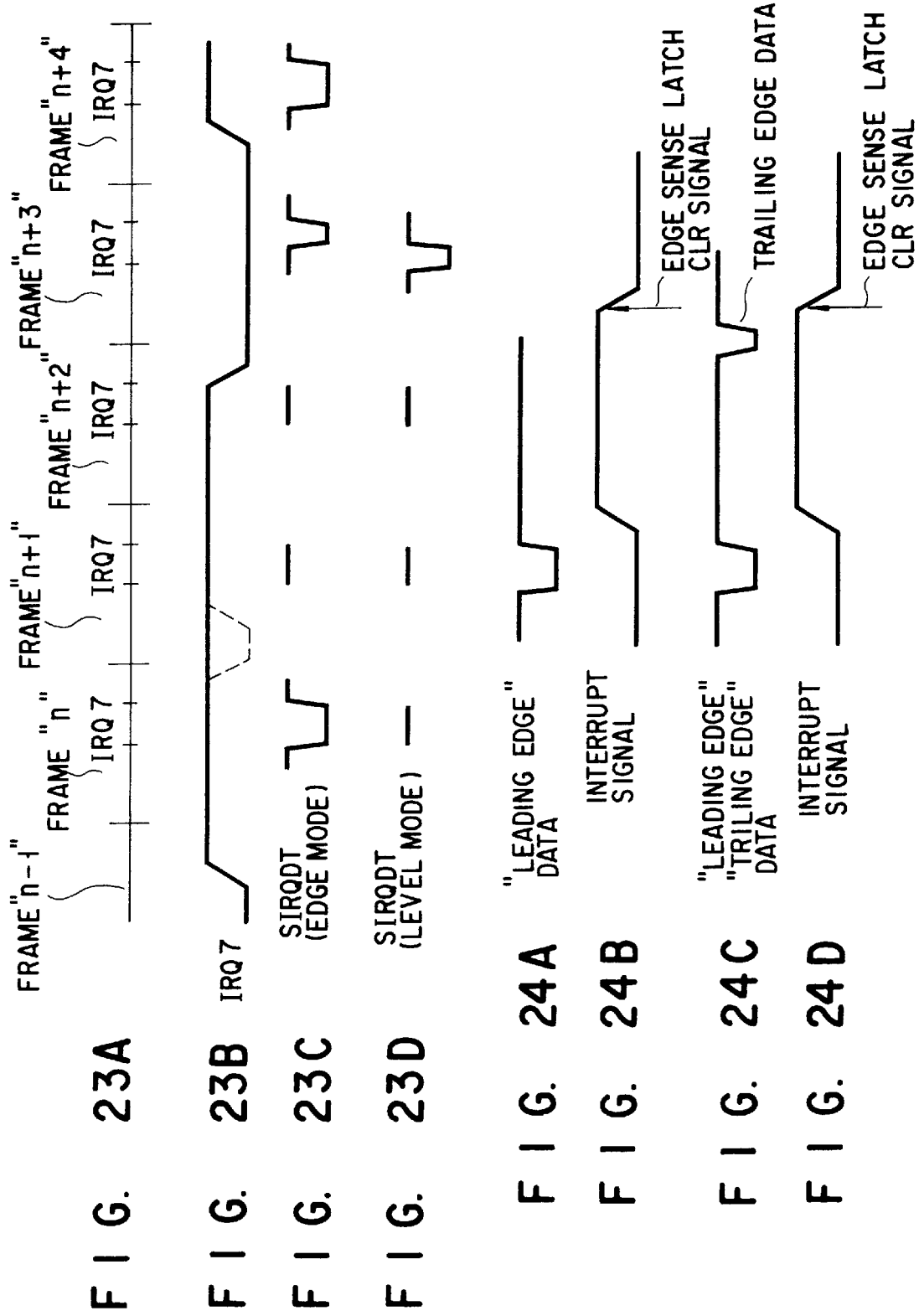

F I G. 25A SIRQCKI 
F I G. 25B $\overline{IRQXLP}$ 
F I G. 25C QN OUTPUT OF F/F 149 
F I G. 25D OUTPUT OF OR 157 
F I G. 26A SIRQCKI 
F I G. 26B $\overline{IRQXLP}$ 
F I G. 26C OR OUTPUT OF SIRQCKI AND $\overline{IRQXLP}$ 
F I G. 26D OUTPUT OF OR GATE 153 
F I G. 27A SIRQCKI 
F I G. 27B $\overline{IRQXLP}$ 
F I G. 27C OUTPUT OF F/F 145 
F I G. 27D OR OUTPUT OF OUTPUT OF F/F 145 AND $\overline{IRQXLP}$ 

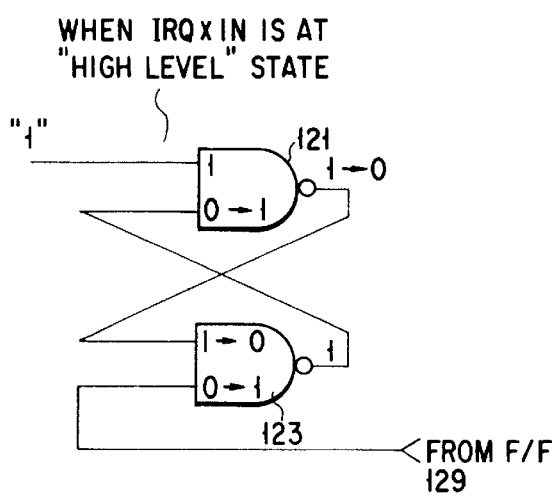
WHEN IRQxIN IS AT "HIGH LEVEL" STATE
F I G. 28A
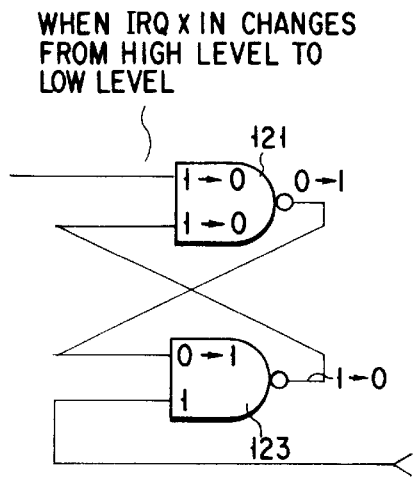
WHEN IRQxIN CHANGES FROM HIGH LEVEL TO LOW LEVEL
F I G. 28B
F I G. 29A  SIRQCKI
F I G. 29B  IRQxIN
F I G. 29C  OUTPUTS OF F/F 127, 129
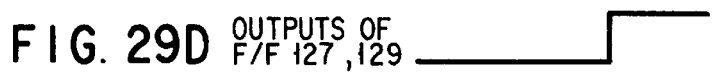
F I G. 29D  OUTPUTS OF F/F 127, 129
F I G. 30A  SIRQCKI
F I G. 30B  IRQxIN
F I G. 30C  IRQxIN

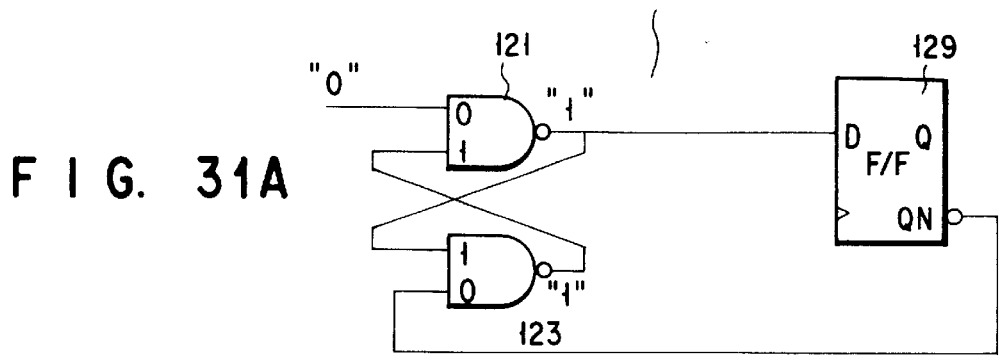
F I G. 31A
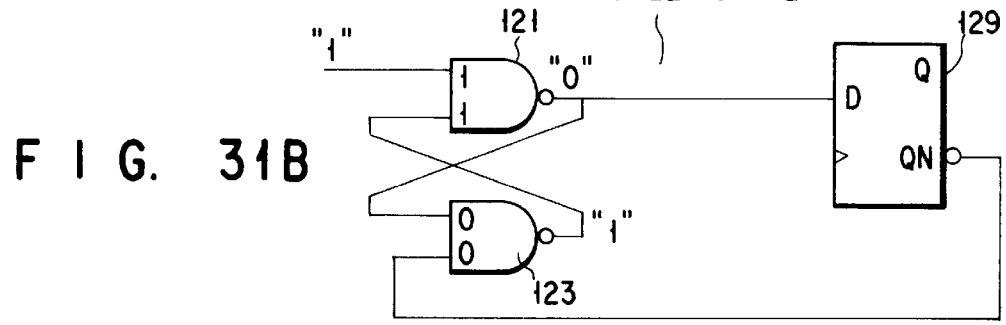
F I G. 31B
FIG. 32A sSIRQDT1 
FIG. 32B pSIRQCK 
FIG. 32C OUTPUT OF XOR 237 
FIG. 32D OUTPUT OF F/F 239 
FIG. 32E OUTPUT OF F/F 241 

SERIAL INTERRRUPT CONTROL SYSTEM IN A SYSTEM IN WHICH A PLURALITY OF INTERRUPT REQUESTERS ARE CONNECTED TO A SERIAL BUS

BACKGROUND OF THE INVENTION

1. Field of the Invention

The present invention relates to an interrupt control technique for a computer system to be applied to a personal computer and, more particularly, to a serial interrupt control system.

2. Description of the Related Art

Conventionally, laptop or notebook type personal computers are designed to be able to add various expansion functions by connecting expansion cards (option cards such as a PCI expansion card, an ISA expansion card, and the like).

An expansion card is normally connected to a system main body via an expansion unit (to be abbreviated as DS hereinafter) called a desk station or a docking station. The DS includes expansion slots such as ISA slots constituting connection interfaces.

The DS has signal lines for inputting interrupt signals to a processor (CPU) in the system main body. For example, in a computer system adopting AT architecture specifications (the personal computer specifications of IBM Corp.), 16 interrupt signal lines IRQ0 through IRQ15 are prepared, and 11 out of 16 interrupt signal lines are prepared in an ISA slot.

More specifically, the 11 interrupt signal lines prepared in the ISA slot are those corresponding to interrupt signals IRQ3 through IRQ7, IRQ9 through IRQ12, IRQ14, and IRQ15. Except for the interrupt signals IRQ10, IRQ11, and IRQ15 of these signals, standard applications are normally defined for these interrupt signals. For example, IRQ3 is assigned to a serial port (#2, COM2), IRQ5 is assigned to a parallel port (#2, LPT2), IRQ6 is assigned to a floppy disk controller, IRQ9 is assigned to a software interrupt (INT0Ah), IRQ14 is assigned to a hard disk controller, and the like.

The interrupt signals IRQ0 through IRQ2, IRQ8, and IRQ13 are preserved inside the system, and cannot be used for other purposes. IRQ0 is assigned to an interval timer (PIT), IRQ1 is assigned to a keyboard interrupt, IRQ2 is assigned to an interrupt request from a PIC (#2) (for cascade connection), IRQ8 is assigned to a real-time clock interrupt (RTC), and IRQ13 is assigned to co-processor error processing.

The system main body comprises a PIC (programmable interrupt controller) as an interrupt controller, which processes the above-mentioned interrupt signals. That is, the PIC recognizes generation of the interrupt signals IRQ0 through IRQ15, and determines an interrupt signal of which the CPU is to be informed in accordance with a predetermined interrupt priority level.

As the interrupt generation recognition method of the PIC, the AT architecture specifications adopt an edge trigger mode. The edge trigger mode has a significance in only transition from Low level to High level of an interrupt signal, and recognizes the generation of an interrupt signal by the leading edge of the signal. Note that a level trigger mode is also available as the interrupt generation recognition method.

As described above, various expansion functions can be added to the system by means of the DS having expansion slots such as ISA slots. In order to connect the system main body and the DS, a connection interface is required. The connection interface comprises a connector called a docking connector. Since the number of pins of the connection interface is limited, it is not easy to increase the number of signals.

In particular, parallelly transferring 11 interrupt signals prepared in the above-mentioned DS via the connector greatly limits the remaining number of signals, resulting in low expandability of the system. Since the respective chips in the system main body also have a plurality of interrupt signals, mounting all these interrupt signals on a circuit board as wiring lines complicates the design and manufacturing processes.

SUMMARY OF THE INVENTION

It is an object of the present invention to provide a serial interrupt control system which can broaden the use range of the number of signals of an expansion unit and can simplify the wiring or interconnect arrangement of signal lines of the system, in such a manner that a plurality of interrupt signals can be transferred using a minimum required number of signal lines especially in a laptop or notebook type personal computer that can use the expansion unit.

The present invention provides a serial interrupt control system which is applied especially to a laptop or notebook type personal computer that can use an expansion unit, and transfers a plurality of interrupt signals converted into serial data.

An interrupt encoder means converts a plurality of interrupt signals supplied from a request source device, that issues an interrupt request to a processor, into serial data. The serial data is transferred to an interrupt decoder means via a serial data bus. The interrupt decoder means converts the serial data into the original interrupt signals, and supplies the interrupt signals to an interrupt controller (PIC).

With this method, for example, 16 interrupt signals can be transferred from an interrupt request source to the PIC using, e.g., a minimum required number of signal lines. When this method is applied to an expansion unit, since the number of signal lines used for transferring, e.g., 11 interrupt signals can be reduced, the use range of the limited number of signals can be broadened.

According to the first feature of the present invention, all the interrupt signals are used in the edge trigger mode. That is, in this mode, only transition from Low level to High level of an interrupt signal is significant, and a programmable interrupt controller (PIC) recognizes the generation of an interrupt by the leading edge of the interrupt signal.

According to the second feature of the present invention, in order to attain synchronization between an interrupt encoder and an interrupt decoder, the interrupt decoder generates an idle cycle, and the interrupt encoder detects this idle cycle to attain synchronization.

According to the third feature of the present invention, a bridge circuit generates, on the basis of an idle cycle of a primary bus, an idle cycle earlier by one cycle than the idle cycle of the primary bus, and outputs it to a secondary bus, thus attaining synchronization between the primary and secondary buses in the bridge circuit.

According to the fourth feature of the present invention, not only the leading edge information of an interrupt signal but also the trailing edge information can be serially transferred.

According to the fifth feature of the present invention, the leading edge information, trailing edge information, and level information of an interrupt signal can be transferred. Further, an edge mode or a level mode can be selected in units of interrupt signals.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention and, together with the general description given above and the detailed description of the preferred embodiment given below, serve to explain the principles of the invention.

FIGS. 3A and 3B are timing charts of the idle cycle of the serial interrupt control system of the present invention, in which FIG. 3A shows a serial clock SIRQCK, and FIG. 3B shows serial data SIRQDT;

FIGS. 3D and 3E are timing charts of the request cycle, in which FIG. 3D shows a serial clock SIRQCK, and FIG. 3E shows serial data SIRQDT;

FIGS. 4A, 4B, 4C, 4D and 4E are timing charts showing the shortest case upon transferring an interrupt signal IRQ3, in which FIG. 4A shows a serial clock signal SIRQCK, FIG. 4B shows the interrupt signal IRQ3, FIG. 4C shows the synchronized interrupt signal IRQ3, FIG. 4D shows the latched interrupt signal IRQ3, and FIG. 4E shows serial interrupt data SIRQDT output from an IENC;

FIGS. 4F, 4G, 4H, 4I, and 4J are timing charts showing the longest case upon transferring the interrupt signal IRQ3, in which FIG. 4F shows a serial clock SIRQCK, FIG. 4G shows the interrupt signal IRQ3, FIG. 4H shows the synchronized interrupt signal IRQ3, FIG. 4I shows the latched interrupt signal IRQ3, and FIG. 4J shows serial interrupt data SIRQDT output from the IENC;

FIGS. 5A and 5B are timing charts showing the timings of a clock signal (pSIRQCK) and serial data (pSIRQDT) on a primary bus, and FIGS. 5C and 5D are timing charts showing the timings of a clock signal (sSIRQCK) and serial data (sSIRQDT) on a secondary bus;

FIG. 6 is a circuit diagram showing a logic circuit which is arranged in an interrupt encoder IENC, and detects an idle cycle and generates latch pulses of an interrupt signal;

FIG. 11 is a circuit diagram showing a logic circuit which is arranged in the interrupt bridge controller and transfers interrupt serial data for the secondary bus to the primary bus;

FIGS. 12A, 12B, 12C, 12D, 12E, and 12F are waveform charts of various output signals from the logic circuit shown in FIG. 6, in which FIG. 12A shows the output signal from an F/F 70-0, and FIGS. 12B through 12F show the output waveforms of F/Fs 70-1 through 70-11 (IRQ3LP(–) through IRQ15LP(–));

FIGS. 13A, 13B, 13C, 13D, and 13E are waveform charts showing the input and output waveforms of the circuit shown in FIG. 7, in which FIG. 13A shows a signal IRQ3LP(–), FIG. 13B shows a signal IRQ3IN, FIG. 13C shows the output signal from a NAND gate 76, FIG. 13D shows the output signal from an F/F 77, and FIG. 13E shows the output signal from an OR gate 78; and FIG. 14 is a block diagram showing a simplified circuit of the circuit shown in FIG. 9.

FIGS. 15A through 15F are timing charts showing various signals in an expansion serial interrupt transfer mode according to the second embodiment, in which FIG. 15A shows a serial clock signal obtained by dividing a serial clock signal of the first embodiment into two, FIG. 15B shows serial interrupt data for generating a synchronization cycle, FIG. 15C shows serial interrupt data used when leading edge information and trailing edge information are transferred, FIG. 15D shows serial interrupt data in a level mode, FIG. 15E shows the input timing of an interrupt signal IRQ5 to a PIC in response to transition of level data, and the input timing of IRQ14 to the PIC in response to the trailing edge data shown in FIG. 15C, and FIG. 15F shows the input timing of an interrupt signal IRQ7 to the PIC in response to the leading edge data shown in FIG. 15C, and the clearance timing of an edge sense latch;

FIGS. 16A and 16B are timing charts showing an expansion request cycle, in which FIG. 16A shows a serial clock signal (SIRQCK), and FIG. 16B shows serial interrupt data (SIRQDT);

FIGS. 17A, 17B, 17C and 17D are timing charts showing various signals in an expansion bridge, in which FIG. 17A shows a primary serial interrupt signal (pSIRQCK), FIG. 17B shows primary serial interrupt data (pSIRQDT), FIG. 17C shows a secondary serial interrupt signal (sSIRQCK), and FIG. 17D shows secondary serial interrupt data (sSIRQDT);

FIG. 18 is a circuit diagram showing an expansion IENC in the second embodiment;

FIG. 19 is a circuit diagram showing a logic circuit arranged in an expansion IDEC to generate a synchronization clock (SIRQCK);

FIG. 21 is a circuit diagram showing a logic circuit for transferring serial interrupt data on a secondary bus to a primary bus in the second embodiment;

FIG. 22 is a table showing the meanings of respective combinations of the first and second halves of the serial interrupt data (SIRQDT) in edge and level modes;

FIGS. 23A, 23B, 23C and 23D are timing charts showing transfer of the "leading" edge information and "trailing" edge information of the interrupt signal IRQ7 in the edge and level modes;

FIGS. 24A, 24B, 24C and 24D are timing charts showing a difference in reset timing between interrupt signals in the first and second embodiments;

FIGS. 25A, 25B, 25C, and 25D are timing charts showing generation of serial interrupt data in the level mode according to the second embodiment;

FIGS. 26A, 26B, 26C and 26D are timing charts showing generation of the serial interrupt data of trailing edge information in the edge mode in the expansion IENC according to the second embodiment;

FIGS. 27A, 27B, 27C and 27D are timing charts showing generation of the serial interrupt data of leading edge information in the edge mode in the expansion IENC according to the second embodiment;

FIGS. 28A and 28B are views for explaining a function of a bistable multivibrator in the expansion IENC according to the second embodiment;

FIGS. 29A, 29B, 29C and 29D are timing charts for explaining an accompanying function of the bistable multivibrator shown in FIGS. 28A and 28B;

FIGS. 30A, 30B and 30C are timing charts for explaining an accompanying function of the bistable multivibrator shown in FIGS. 28A and 28B;

FIGS. 31A and 31B are views for explaining an function of the bistable multivibrator in the expansion IENC according to the second embodiment; and FIGS. 32A, 32B, 32C, 32D and 32E are timing charts for explaining the function of an exclusive OR in an expansion IBRG according to the second embodiment.

DETAILED DESCRIPTION OF THE PREFERRED EMBODIMENT

The preferred embodiment of the present invention will be described hereinafter with reference to the accompanying drawings.

Figure 1:
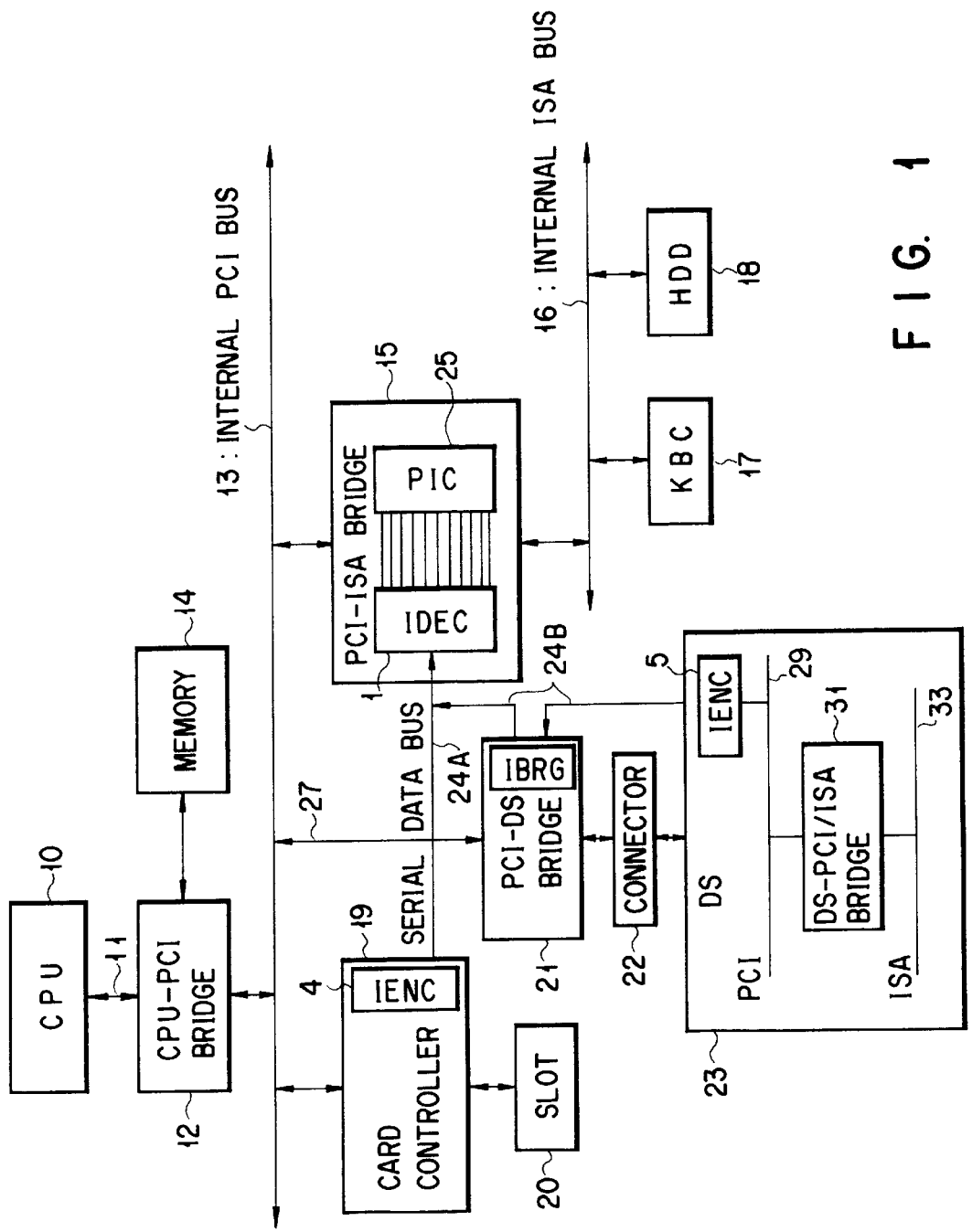
FIG. 1 is a block diagram showing the arrangement of a personal computer system to which a serial interrupt control system of the present invention is applied.
Figure 2:
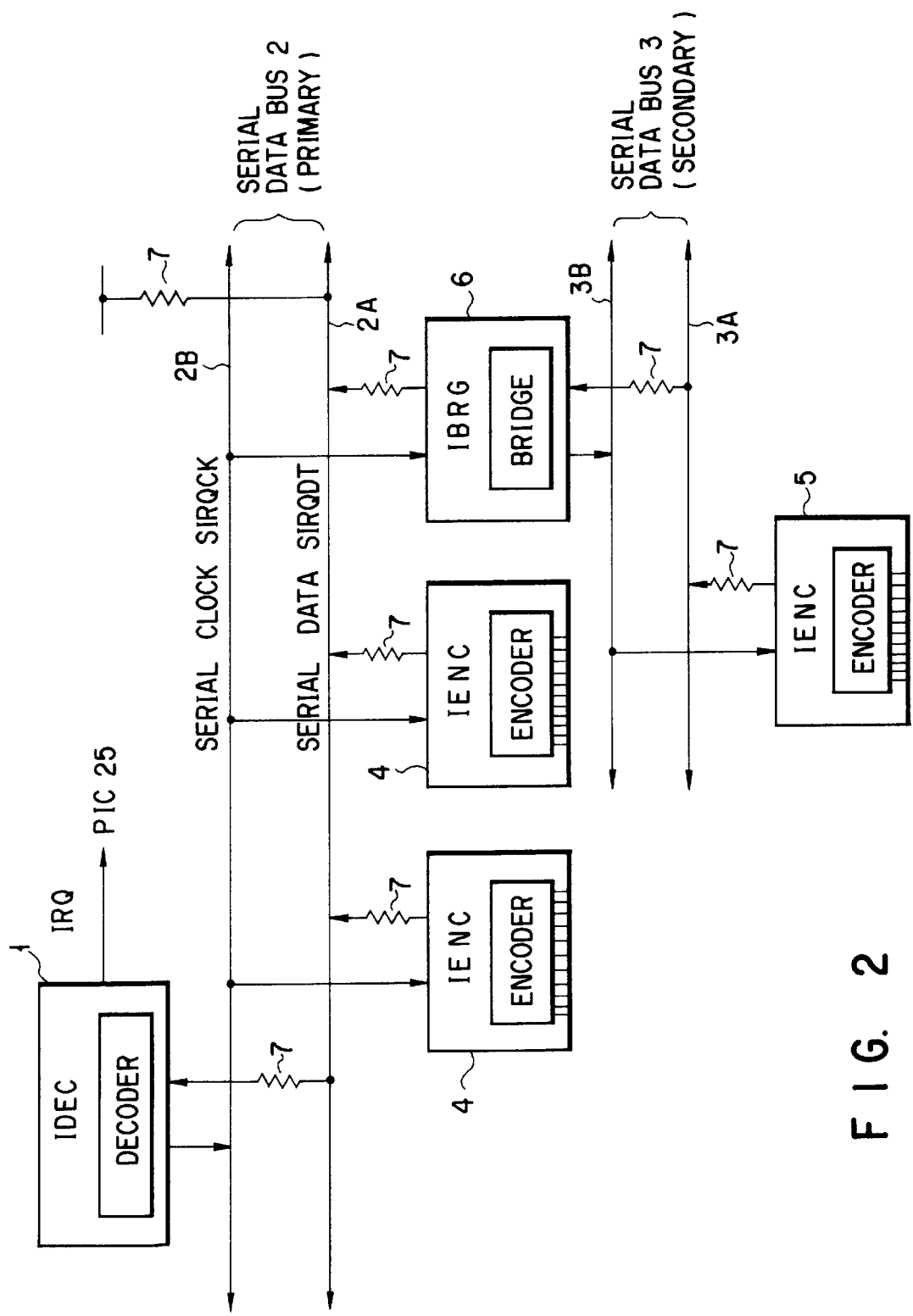
FIG. 2 is a block diagram of the serial interrupt control system of the present invention.

FIG. 1 is a block diagram showing the arrangement of a personal computer system to which a serial interrupt control system of the present invention is applied, and FIG. 2 is a block diagram of the serial interrupt control system of the present invention.

(System Arrangement)

A serial interrupt control system of this embodiment is applied especially to a laptop or notebook type personal computer that can use an expansion unit, and comprises a programmable interrupt controller (PIC) 25 for processing, e.g., 16 interrupt signals IRQ0 through IRQ15.

As shown in FIG. 1, a personal computer of this embodiment assumes a computer system comprising, e.g., a chip set (a plurality of LSIs) of AT architecture specifications, and a processor bus 11, an internal PCI (Peripheral Component Interconnect) bus 13, and an internal ISA (Industry Standard Architecture) bus 16 are arranged on the board of the system main body.

Also, a processor (CPU) 10, a CPU-PCI bridge circuit 12, a system memory 14, a PCI-ISA bridge circuit 15, a PCI-DS bridge circuit 21, a PC card controller 19, and the like are arranged on the board of the system main body.

On the other hand, a DS (desk station or docking station) 23 serving as an expansion unit is connected to the system main body via a DS connector 22. An external PCI bus and an external ISA bus are arranged in the DS 23.

Furthermore, a DS-PCI/ISA bridge circuit 31, a PCI expansion slot that can receive a PCI expansion card, an ISA expansion slot that can receive an ISA expansion card are arranged in the DS 23. The PCI expansion slot is connected to an external PCI bus 29. The ISA expansion slot is connected to an external ISA bus 33.

The system memory 14 comprises a DRAM which stores an OS, device drivers, application programs, processing data, and the like required for the operation of the CPU 10.

The CPU-PCI bridge circuit 12 is a bus relay circuit for bridging between the processor bus 11 and the internal PCI bus 13, and serves as one of bus masters of the internal PCI bus 13. The CPU-PCI bridge circuit 12 also has a function of bidirectionally converting a bus cycle including data and an address between the processor bus 11 and the internal PCI bus 13, a function of access-controlling the system memory 14 via a memory bus, and the like.

The PCI-ISA bridge circuit 15 is a bus relay circuit for bridging between the internal PCI bus 13 and the internal ISA bus 16 constituting local buses, and serves as a bus master of the internal PCI bus 13.

The PCI-ISA bridge circuit 15 has the PIC 25 associated with this embodiment. Although not shown, the circuit 15 comprises components such as a PCI interface, an ISA controller, a DMA controller, a system timer (PIT), and the like.

The PIC 25 is a programmable interrupt controller having an interrupt processing function of, e.g., 82C 59 or equivalent, and receives, e.g., 16 interrupt signals prepared for the system of the AT architecture specifications.

In this embodiment, as will be described later, the PIC 25 receives a plurality of interrupt signals obtained by decoding serial data serially transferred via special-purpose serial data buses 24A and 24B, and executes predetermined interrupt processing. More specifically, the PIC 25 determines an interrupt request signal corresponding to a high-priority level interrupt request from the plurality of input interrupt signals, and supplies the determined interrupt signal to the CPU 10.

The PIC 25 of this embodiment operates in an edge trigger mode that recognizes generation of an interrupt on the basis of the leading edge upon transition of an interrupt signal from Low level to High level.

The internal ISA bus 16 is connected to a keyboard controller (KBC) 17, a hard disk device (HDD) 18, a BIOS ROM, a real-time clock (RTC), an I/O port controller (which are not shown), and the like.

The PC card controller 19 is one of bus masters of the internal PCI bus 13, and controls a PC card (an IC card complying with the PCMCIA (Personal Computer Memory Card International Association) standard) inserted in an expansion card slot 20 complying with the PCMCIA standard.

The PC card controller 19 has an interrupt encode controller (IENC) 4 (to be described later), and has a function of converting an interrupt request (IRQx) from the PC card into serial data and serially transferring the converted data to the PIC 25 via the serial data bus 24A (see FIG. 2).

The PCI-DS bridge circuit 21 serves as a bus relay circuit for bridging between the internal PCI bus 13 and a docking bus 27 corresponding to a PCI bus connected to the DS 23.

The DS 23 has the DS-PCI/ISA bridge circuit 31, as described above. The DS-PCI/ISA bridge circuit 31 is a bus relay circuit for bridging between the internal PCI bus 13 of the system main body, and the external PCI bus 29 or the external ISA bus 33, via the DS connector 22.

Furthermore, the DS-PCI/ISA bridge circuit 31 of the DS 23 has a function of converting an interrupt request (IRQx)

from a PCI or ISA expansion slot (not shown) into serial data and serially transferring the converted data via the serial data bus 24B (see FIG. 2).

(Arrangement of Serial Interrupt Transfer Control System)

As shown in FIG. 2, the serial interrupt control system of this embodiment has serial data bus lines (primary buses) 2A and 2B on the system main body side, and external serial data bus lines (secondary buses) 3A and 3B (on the expansion unit side).

The primary bus lines 2A and 2B correspond to the special-purpose serial data bus 24A in the system main body shown in FIG. 1. The secondary bus lines 3A and 3B correspond to the special-purpose serial data bus 24B connected to the DS 23.

The serial data bus lines 2A, 2B, 3A, and 3B are relayed by an interrupt bridge controller (IBRG) 6. The IBRG 6 corresponds to the relay function included in the PCI-DS bridge circuit 21 shown in FIG. 1.

The primary bus lines 2A and 2B consist of two signal lines, i.e., a signal line 2A for transferring serial data SIRQDT, and a signal line 2B for transferring a serial clock signal SIRQCK. Similarly, the secondary bus lines 3A and 3B consist of two signal lines, i.e., a signal line 3A for transferring serial data SIRQDT, and a signal line 3B for transferring a serial clock signal SIRQCK.

Serial data SIRQDT is a serial interrupt request signal output from the interrupt encode controller (IENC) 4 and an interrupt encode controller (IENC) 5. The IENC 4 in the system main body corresponds to an interrupt controller included in the PC card controller 19, as shown in, e.g., FIG. 1. That is, the IENC 4 converts (encodes) the respective interrupt signals (interrupt request signals IRQx) into serial data SIRQDT and outputs the converted data.

On the other hand, the external IENC 5 corresponds to an interrupt controller included in the DS 23, as shown in, e.g., FIG. 1. That is, the IENC 5 converts the respective interrupt signals (interrupt request signals IRQx) from the PCI or ISA expansion slot into serial data SIRQDT and outputs the converted data.

An interrupt decode controller (IDEC) 1 receives serial data SIRQDT transferred from the IENC 4 via the signal line 2A, converts (decodes) the received serial data into original interrupt signals, and supplies the converted signals to the PIC 25. The IDEC 1 corresponds to a controller included in the PCI-ISA bridge circuit 15, as shown in FIG. 1.

The IDEC 1 receives serial data SIRQDT transferred from the IENC 5 via the secondary bus lines 3A and 3B and the IBRG 6, converts it into an original interrupt signal, and supplies the converted signal to the PIC 25.

Note that the IDEC 1, IENCs 4 and 5, and IBRG 6 are connected to the signal lines 2A and 3A via pull-up resistors 7 since they adopt the open-drain output specifications. Furthermore, each open-drain output requires a current limiting resistor in the case of the rising acceleration specifications.

Examples of the respective constituting components will be explained below with reference to FIGS. 3A through 14. Note that the following description is associated with the primary bus lines 2A and 2B on the system main body side unless otherwise specified. When the primary bus lines 2A and 2B, and the secondary bus lines 3A and 3B must be distinguished from each other for the sake of description, "p" indicating "primary" or "s" indicating "secondary" is appended to the head of each name (e.g., a serial clock signal pSIRQCK, serial data sSIRQDTI, and so on).

(Serial Data Format)

The serial clock signal SIRQCK serves as a clock pulse signal which has a clock waveform that periodically repeats High and Low levels, and is used for attaining synchronization among the controllers.

The interval from a given leading edge to the next leading edge of the serial clock signal SIRQCK is called a cycle. The respective cycles are distinguished from each other by assigning serial numbers from "1" to "12" to them (cycle 1, cycle 2, . . . ). That is, a total of 12 cycles include an idle cycle +11 cycles of interrupt signals (IRQ3 through IRQ7, IRQ9 through IRQ12, IRQ14, and IRQ15). The 12 cycles constitute one unit called a frame, and the respective frames are processed while being distinguished from each other like frame n−1, frame n, frame n+1, . . .

On the primary bus lines 2A and 2B, the serial clock signal SIRQCK is driven by the IDEC 1 and is supplied to the IENC 4 and IBRG 6. On the other hand, on the secondary bus lines 3A and 3B, the serial clock signal SIRQCK is driven by the IBRG 6, and is supplied to the IENC 5.

The serial data SIRQDT is an active-Low open-drain signal, and is data used for serially transferring generation of an interrupt (leading edge).

While none of the controllers are driving, they are held in a high-impedance (Hi-Z) state by the pull-up resistors 7. On the primary bus lines 2A and 2B, the serial data SIRQDT is driven to Low level during the period for one cycle (or more) by the IDEC 1, IENC 4, or IBRG 6, as needed.

In order to accelerate transition from Low level to the Hi-Z state of an open-drain signal, the serial data SIRQDT is driven to High level only for a short period of time immediately after the Low-level cycle ends. At this time, since the IENC 4 or IBRG 6 may drive the data to Low level, current limiting resistors are added to the output sides of the respective controllers. The resistance of each current limiting resistor is set to be a value sufficiently smaller than that of the pull-up resistor 7 (i.e., is set so that the Low-level voltage value satisfies the Low-level input specifications of each controller).

The serial data SIRQDT is sampled by the IDEC 1 (the IBRG 6 on the secondary bus lines 3A and 3B) in response to the trailing edge of each cycle (the leading edge of the serial clock signal SIRQCK).

Figure 3A:

In the idle cycle, as shown in FIG. 3A, only cycle 1 of each frame (n−1, n, n+1) is driven to Low level by the IDEC 1. The remaining 11 cycles are not driven by any controllers (the Hi-Z state indicated by a dotted line). The IENC 4 and the IBRG 6 detect the idle cycle by counting the serial clock signal SIRQCK to attain internal synchronization.

(Interrupt Request Cycle)

When a device (e.g., the PC card controller 19) connected to the IENC 4 generates an interrupt (an interrupt request), the IENC 4 detects the leading edge of the interrupt signal, and drives a specific cycle to Low level.

Figure 3B:

The correspondence between the respective cycles and the types of interrupt (number IRQx) is set as shown in FIG. 3B. Cycle 1 is the idle cycle for attaining synchronization, as described above.

Since this embodiment assumes the AT architecture specifications, interrupt signals IRQ0 through IRQ2, IRQ8, and IRQ13 of the 16 interrupt signals IRQ0 through IRQ15 are preserved in the system, and cannot be used for other purposes. Therefore, the 11 interrupt signals IRQ3 through IRQ7, IRQ9 through IRQ12, IRQ14, and IRQ15 are assigned to cycles 2 to 12.

Figure 3C:
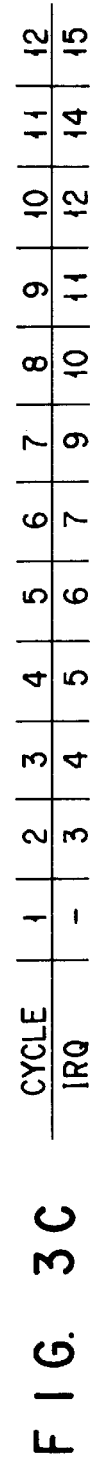
FIG. 3C is a view showing the relationship between the cycles and interrupt numbers.
Figure 3D:
Figure 3E:

Assume that a device connected to the IENC 4 generates an interrupt signal IRQ4 in frame n, and the same or another device connected to the IENC 4 generates an interrupt signal IRQ11 in the same frame (see FIGS. 3D and 3E).

Note that the corresponding cycle is driven to Low level during only one frame, i.e., frame n. In other words, the interrupt state to be serially transferred to the IDEC 1 is only the leading edge information of an interrupt signal IRQx.

During a period (the High-level period of IRQx) in which a device connected to the IENC 4 continues generation of an interrupt, upon stopping generation of an interrupt (the trailing edge of IRQx), and in the state wherein no interrupt is generated (the Low-level period of IRQx), an interrupt state is not transferred to the IDEC 1. Therefore, the trailing edge of an interrupt is generated inside the IDEC 1 (independently of IRQx). This generation is attained using, e.g., the internal timing of the PIC 25.

The PIC 25 normally has a function of setting the corresponding bit of an ISR (In-Service Register) upon reception of an interrupt. Using this internal timing of the PIC 25, the interrupt state set in the IDEC 1 is reset. More specifically, the internal timing is the timing for clearing an edge sense latch (CESL) generated upon setting the corresponding bit.

The leading-edge of an interrupt signal generated until a timing immediately before a given cycle is serially transferred in the given cycle. The leading edge of an interrupt signal generated during a period immediately after the given cycle until a timing immediately before the next cycle is transferred in the next cycle.

In this case, in practice, since a time for one cycle is required for synchronizing an interrupt signal IRQx with the serial clock signal SIRQCK, the state one cycle before (immediately before) the given cycle is transferred. Therefore, upon transfer of generation of an interrupt to the PIC 25 via the IENC 4 and the IDEC 1, a delay time for two cycles (+') in the shortest case or for 14 cycles (−') in the longest case is generated. Note that each of the High- and Low-pulse widths of an interrupt signal requires at least "1 cycle+'".

FIGS. 4A through 4J show the shortest case (FIGS. 4A through 4E) and the longest case (FIGS. 4F through 4J) upon serially transferring, e.g., an interrupt signal IRQ3. That is, (the leading edge of) an interrupt signal generated until cycle 12 of frame n is serially transferred in cycle 2 of frame n+1 (see FIGS. 4E and 4J).

The above-mentioned processing operations are independently performed in units of interrupt signals (IRQx). That is, the IENC 4 and the IDEC 1 have conversion circuits in units of IRQx.

(Arrangement of IBRG 6)

As described above, the IBRG 6 bridges between the secondary bus lines 3A and 3B, and the primary bus lines 2A and 2B, and an interrupt signal from the secondary bus lines 3A and 3B is supplied to the primary bus lines 2A and 2B via the IBRG 6.

The secondary bus lines 3A and 3B operate at a timing earlier by one cycle than the primary bus lines 2A and 2B since they are synchronized with the primary bus lines 2A and 2B inside the IBRG 6, as shown in FIGS. 5C and 5D.

More specifically, based on the idle cycle (cycle 1) of the primary bus lines 2A and 2B, the IBRG 6 generates an idle cycle earlier by one cycle than the idle cycle of the primary bus lines 2A and 2B, and outputs it to the secondary bus lines 3A and 3B.

The IBRG 6 samples serial data sSIRQDTI upon generation of an interrupt from a device connected to the IENC 5 (sIENC). That is, when the IBRG 6 detects a Low-level cycle (cycle 5) driven by the sIENC 5 on the secondary bus lines 3A and 3B, it outputs serial data sSIRQDTI onto the primary bus lines 2A and 2B in synchronism with the timing of the primary bus lines 2A and 2B.

Note that a delay time for one cycle is generated when a signal has passed one stage the IBRG 6. The number of stages of the IBRG 6 is not particularly limited, but delay times accumulate as the number of stages increases.

To summarize, the IBRG 6 is a controller having a function of attaining synchronization of the secondary bus lines 3A and 3B by detecting the idle cycle of the primary bus lines 2A and 2B, a function of transferring serial data sSIRQDTI of the secondary bus lines 3A and 3B to the primary bus lines 2A and 2B, and a function of accelerating rising (from Low level to High level, from High level to Hi-Z level) of the open-drain output of serial data sSIRQDTI.

Figure 10:
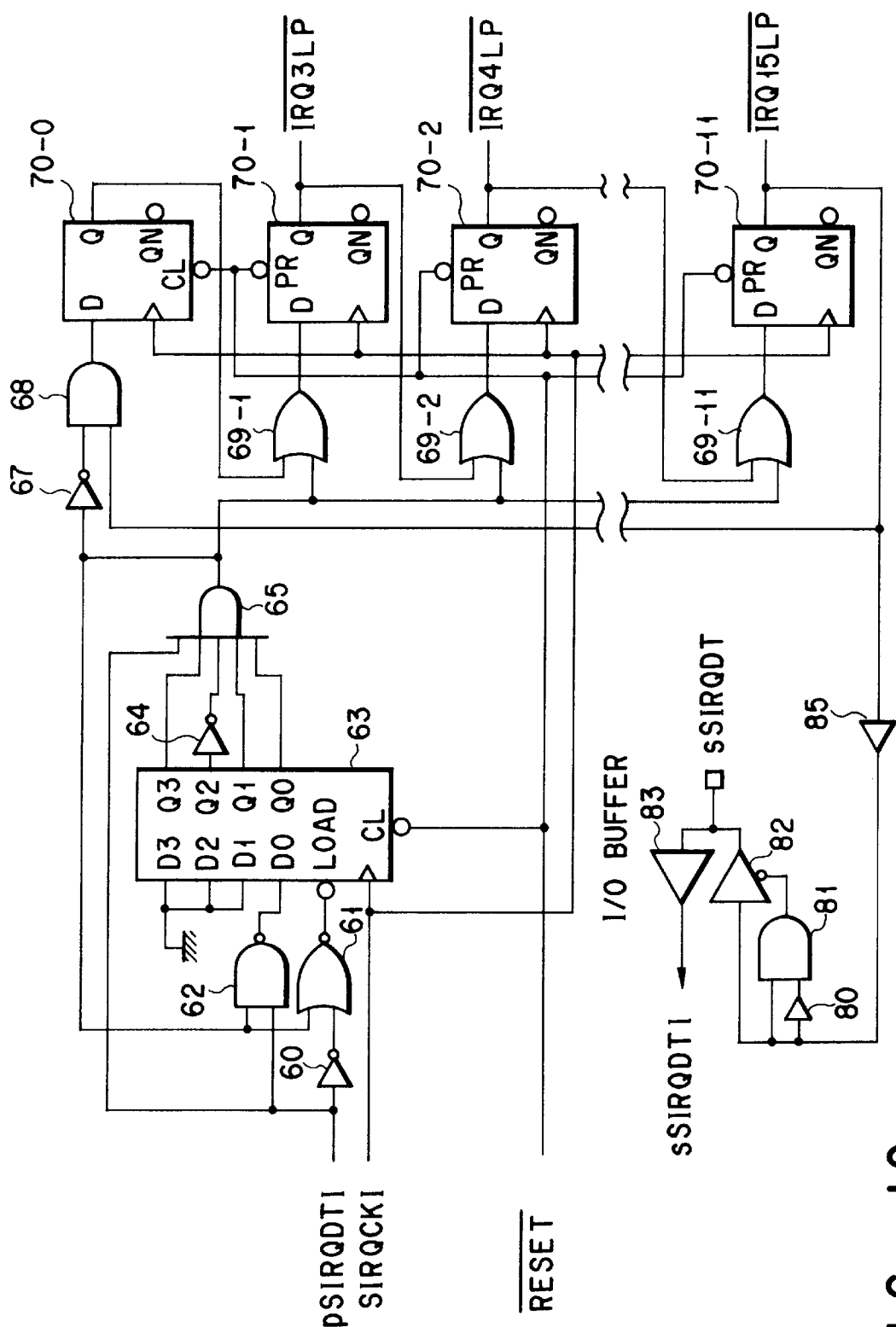
FIG. 10 is a circuit diagram showing a logic circuit which is arranged in an interrupt bridge controller, generates an idle cycle of the secondary bus by detecting the idle cycle of the primary bus, and generates latch pulses of interrupt serial data for the secondary bus.
Figure 48:
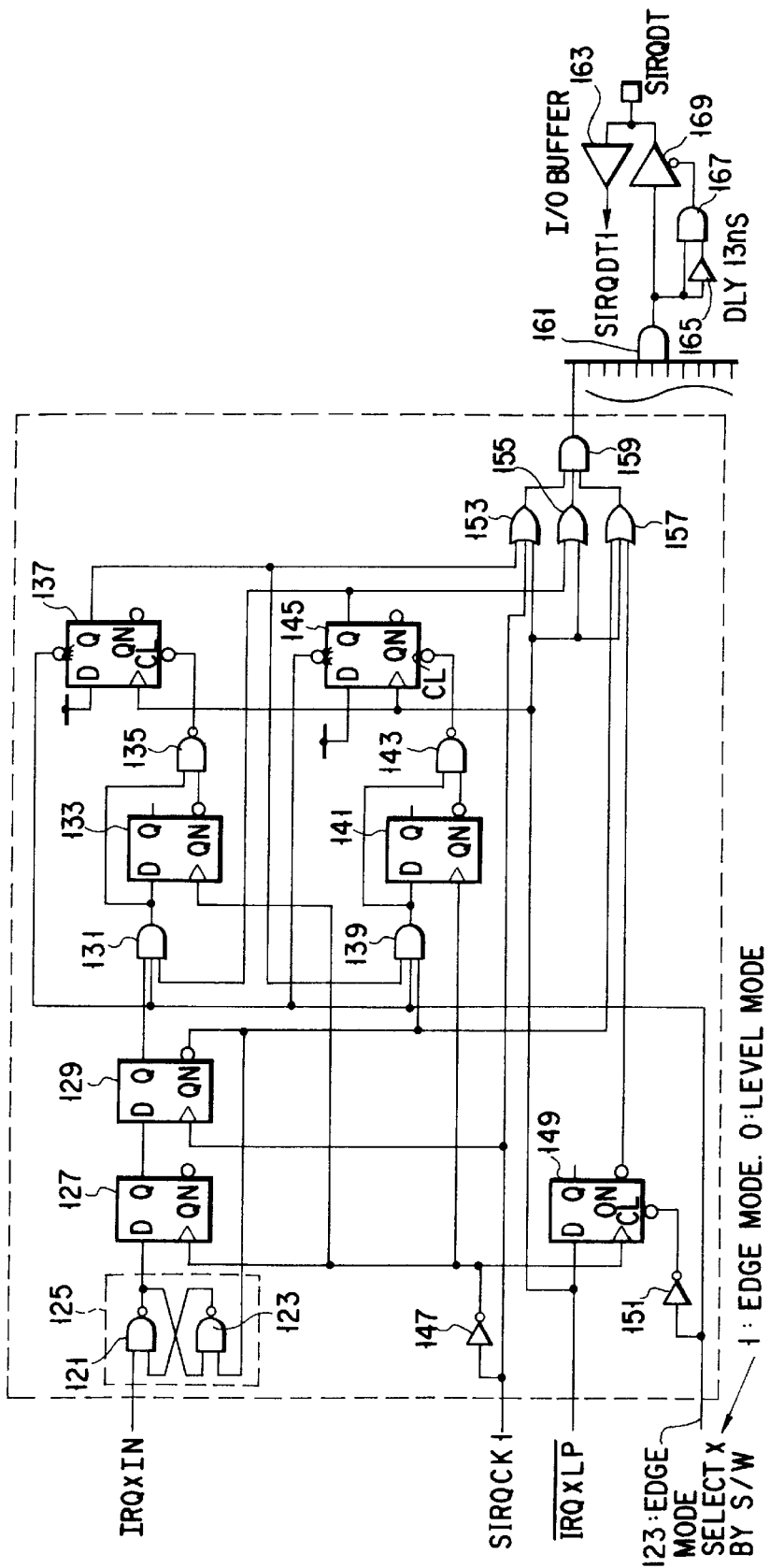

FIG. 10 is a circuit diagram showing a portion of the IBRG 6, i.e., an example of a logic circuit for generating an idle cycle of the secondary bus lines 3A and 3B by detecting the idle cycle of the primary bus lines 2A and 2B, and generating latch pulses of the interrupt serial data sSIRQDTI of the secondary bus lines 3A and 3B. That is, this logic circuit comprises inverters 60, 64, and 67, a NOR gate 61, a NAND gate 62, a synchronization up counter 63, AND gates 65, 68, and 81, a shift register constituted by OR gates 69 and flip-flops 70, a delay circuit (15 ns) 80, a delay circuit (10 ns) 85, and I/O buffer circuits (open-drain outputs) 82 and 83.

FIG. 11 is a circuit diagram showing the remaining portion of the IBRG 6, i.e., an example of a logic circuit for transferring interrupt serial data sSIRQDTI of the secondary bus lines 3A and 3B to the primary bus lines 2A and 2B. That is, this logic circuit comprises an inverter 110, an OR gate 111, an input buffer circuit 112, a flip-flop 113, an output buffer circuit 114, the delay circuit (15 ns) 80, an AND gate 81, and the I/O buffer circuits (open-drain outputs) 82 and 83.

(Arrangement of IDEC 1 and IENCs 4 and 5)

Each of the IENCs 4 and 5 is a controller having a function of attaining synchronization by detecting the idle cycle, a function of reliably detecting only the leading edge of an interrupt signal, a function of independently executing the edge detection in units of interrupt signal lines, and a function of accelerating rising (from Low level to High level, from High level to Hi-Z level) of the open-drain output of serial data SIRQDT.

FIG. 6 shows an example of a logic circuit for detecting the idle cycle and generating latch pulses (indicated by IRQxLP(−)) of the respective interrupt signals in the IENCs 4 and 5 (see FIGS. 3A and 3B). That is, the logic circuit comprises inverters 60, 64, and 67, a NOR gate 61, a NAND gate 62, a synchronization up counter 63, AND gates 65 and 68, an input buffer circuit 66, and a shift register constituted by OR gates 69 and flip-flops (F/Fs) 70.

In FIG. 6, the synchronization up counter 63 is a duo-decimal counter for counting from 0 through 11. As shown in FIG. 3A, one frame is constituted by cycles 1 through 12. That is, as shown in FIG. 3C, one frame is constituted by a total of 12 cycles, i.e., cycles (cycles 2 through 12) corresponding to 11 interrupt signals (IRQ3 through IRQ7, IRQ9 through IRQ12, IRQ14, and IRQ15) and a cycle (cycle 1) for attaining synchronization with the IDEC 1. The synchronization up counter 63 counts these 12 cycles.

In the idle cycle shown in FIGS. 3A and 3B, the synchronization up counter 63 periodically counts cycles 1 to 12. When the count value of the synchronization up counter 63 has reached "1011" (Q3: 1, Q2: 0, Q1: 1, Q0: 1) and a serial interrupt data signal (SIRQDTI: to be described later) changes to logic "1", the AND gate 65 outputs a signal of logic "1". The signal of logic "1" is input to one input terminal of the NAND gate 62, and to one input terminal of the NOR gate 61. The other input terminal of the NAND gate 62 receives the above-mentioned signal SIRQDTI of logic "1". The other input terminal of the NOR gate 61 receives the signal SIRQDTI of logic "0", which is inverted by the inverter 60. As a result, the NAND gate 62 inputs a signal of logic "0" to the D0 terminal, and the NOR gate 61 inputs a signal of logic "1" to the LOAD terminal. Since the D1, D2, and D3 terminals are connected to the ground level (logic "0" level), "0000" (D3: 0, D2: 0, D1: 0, D0: 0) is set in the counter 63. Thereafter, in response to a clock signal (SIRQCK), the counter counts from "0" to "11" (cycles 1 to 12) again. More specifically, the signal of logic "1" output form the AND gate 65 means that idle cycles are continuously output as cycles 1 to 12.

The detection of the idle cycle is performed by detecting that a serial data signal (SIRQDT) is driven to Low level in cycle 1, the subsequent cycles 2 to 12 are driven to High level, and the signal is driven to Low level again in cycle 1 in the next frame (n+1) in FIGS. 3A and 3B.

On the other hand, as shown in FIGS. 3D and 3E, when an interrupt signal is generated in the middle of a frame (an interrupt signal IRQ4 in cycle 3 in an example shown in FIGS. 3D and 3E), the synchronization up counter 63 is reset to "1". That is, serial interrupt data (SIRQDTI) of logic "1" is supplied to the other input terminal of the NAND gate 62. On the other hand, since the output from the AND gate 65 is logic "0" until the synchronization up counter 63 counts "1011", a signal of logic "0" is input to one input terminal of the NAND gate 62. For this reason, in response to a signal of logic "1" input from the NOR gate 61 to the LOAD terminal of the synchronization up counter 63, a signal of logic "1" is supplied to the D0 terminal, and the synchronization up counter 63 is set to be "0001" (D3: 0, D2: 0, D1: 0, D0: 1).

The flip-flops 70-0 to 70-11 include 11 flip-flops (F/Fs) 70-1 through 70-11 for respectively latching the above-mentioned 11 interrupt signals IRQ3 through IRQ7, IRQ9 through IRQ12, IRQ14, and IRQ15, and an idle cycle detection flip-flop 70-0. When no idle cycle is detected, the output from the AND gate 65 is logic "0". Therefore, a logic circuit in this case is equivalent to those including none of the AND gate 68 and the OR gates 69-1 through 69-11. Therefore, these F/Fs 70-0 through 70-11 constitute a shift register. At this time, one of F/Fs 70-1 through 70-11 outputs a Low-level signal (interrupt latch pulse IRQxLP(-), and the remaining F/Fs outputs High-level signals. The Low-level signal shifts each time a clock signal (SIRQCKI) is input. When the counter 63 has counted "11", the F/F 70-11 outputs a Low-level signal, which is supplied to the F/F 70-0 again. As will be described later, the decoder side for outputting an idle cycle has a circuit (see FIG. 8) similar to that shown in FIG. 6, and the circuits shown in FIGS. 6 and 8 synchronously operate. In other words, the timing of the signal output from the Q terminal of the F/F 70-0 shown in FIG. 6 matches that of the signal output from the F/F 70-0 shown in FIG. 8.

As described above, the F/Fs 70-1 through 70-11 sequentially output latch pulses for corresponding interrupt signals (see FIGS. 12A through 12F).

Figure 7:
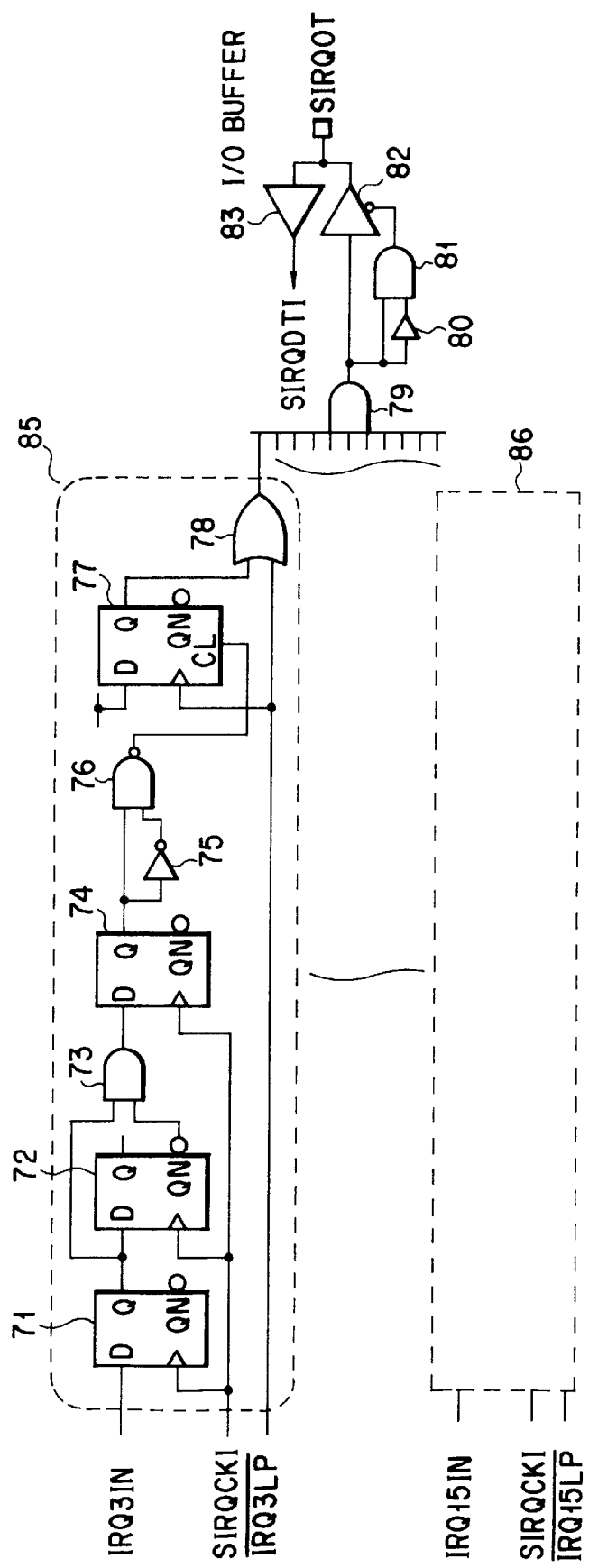
FIG. 7 is a circuit diagram showing a logic circuit which is arranged in the interrupt encoder IENC, and detects the leading edge of an interrupt signal.

FIG. 7 shows an example of a logic circuit 85 for outputting serial data SIRQDT by detecting the leading edge of an interrupt signal (see FIGS. 4A through 4J). More specifically, this logic circuit comprises flip-flops 71, 72, 74, and 77, AND gates 73, 79, and 81, delay circuits (15 ns) 75 and 80, a lNAND gate 76, and I/O buffer circuits (open-drain outputs) 82 and 83.

For the sake of simplicity of the drawing, only one logic circuit is illustrated. However, similar logic circuits (indicated by a broken line) are respectively arranged in correspondence with 11 interrupt signal lines IRQ3 through IRQ7, IRQ9 through IRQ12, IRQ14, and IRQ15.

In the logic circuit shown in FIG. 7, the D input terminal of the F/F 77 is pulled up by a pull-up resistor. When an interrupt signal (IRQxIN) is input, as shown in FIG. 13B, it is supplied to a clear terminal (CL) of the F/F 77 via the F/Fs 71 and 72, the AND gate 73, the F/F 74, and the NAND gate 76, as shown in FIG. 13C. As a result, the Q output of the F/F 77 changes from High level to Low level, as shown in FIG. 13D. A Low-level signal as the Q output of the F/F 77 is supplied to one input terminal of an OR gate 78. The other input terminal of the OR gate 78 is connected to the Q output terminal of the F/F 70-n (e.g., 70-1) shown in FIG. 6. When the Q output terminal of the F/F 70-1 outputs a signal IRQ3LP(-), as shown in FIG. 13A, the signal is supplied to the other input terminal of the OR gate 78. Accordingly, the OR gate 78 outputs a Low-level signal, thus driving a serial data signal (SIRQDT) to Low level.

For the sake of simplicity, a case has been described wherein upon generation of an interrupt signal IRQ3, the leading edge of the signal IRQ3 is detected. As for other interrupt signals (IRQ4 through IRQ7, IRQ9 through IRQ12, IRQ14, and IRQ15), the leading edge of each interrupt signal is detected by a similar arrangement and operation, and the corresponding OR gate 78 outputs a Low-level signal. The signal output from each OR gate 78 is output as serial data (SIRQDT) via the AND gate 79.

Note that the inverter 80, the AND gate 81, and the I/O buffer circuit 82 constitute a circuit for accelerating rising of the open-drain output of the serial data signal (SIRQDT).

The serial data (SIRQDT) is converted into a signal SIRQDTI via the I/O buffer circuit 83, and the signal SIRQDTI is supplied to the LOAD terminal of the counter 63 via the inverter 60 and the NOR gate 61 shown in FIG. 6. As a consequence, the count value of the counter 63 is reset to "0001", (D3: 0, D2: 0, D1: 0, D0: 1).

The IDEC 1 is a controller having a function of generating a synchronization clock, a function of generating an idle cycle, a function of generating an internal interrupt request to the PIC 25 on the basis of the leading edge information of each interrupt signal, a function of canceling the internal interrupt request using ISR (in-service register in the PIC 25) for each interrupt, and a function of accelerating rising (from Low level to High level, from High level to Hi-Z level) of the open-drain output of serial data SIRQDT.

Figure 8:
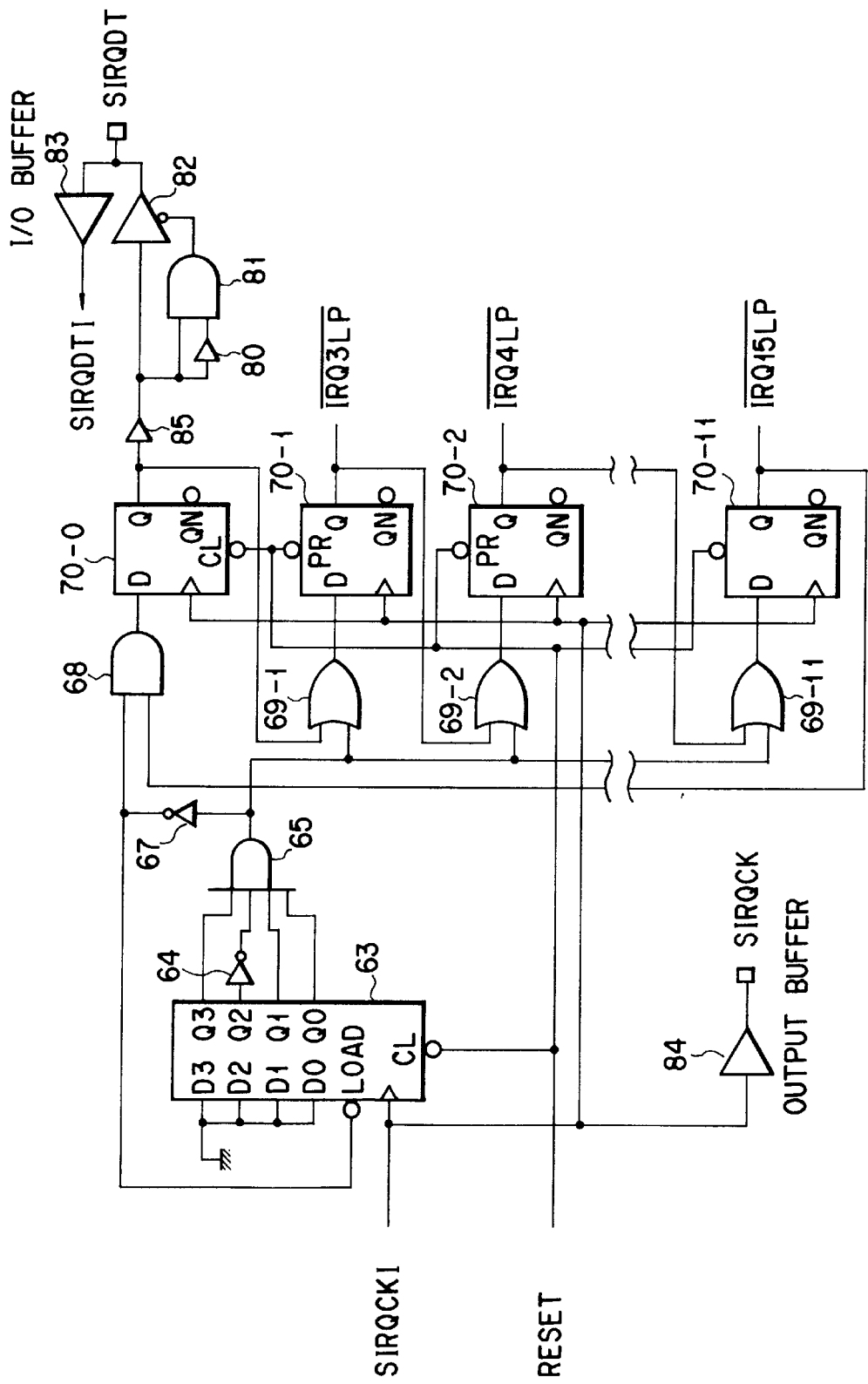
FIG. 8 is a circuit diagram showing a logic circuit which is arranged in an interrupt decoder IDEC, and detects an idle cycle and generates latch pulses of an interrupt signal.

FIG. 8 shows an example of a logic circuit for detecting the idle cycle and generating a latch pulse (IRQxLP(-)) for each interrupt signal. This logic circuit comprises a synchronization up counter 63, inverters 64 and 67, AND gates 65, 68, and 81, an output buffer circuit 84, a shift register constituted by OR gates 69 and flip-flops 70, a delay circuit (15 ns) 80, a delay circuit (10 ns) 85, and I/O buffer circuits (open-drain outputs) 82 and 83.

The logic circuit shown in FIG. 8 has an arrangement similar to that shown in FIG. 6. Therefore, the same reference numerals denote the same parts as in FIG. 6 and a detailed description thereof will be omitted. To summarize, the logic circuit shown in FIG. 8 operates in synchronism with the logic circuit shown in FIG. 6. For this reason, the circuit shown in FIG. 8 outputs a synchronization clock signal (SIRQCK) via the output buffer 84 and supplies it to the input buffer 66 shown in FIG. 6, thereby synchronizing the IENCs 4 and 5 with the IDEC 1.

On the other hand, the idle cycle is generated by the same operation as that described in the description of the logic circuit shown in FIG. 6. Serial data (SIRQDT) output from the AND gate 79 shown in FIG. 7 is converted into a signal SIRQDTI via the I/O buffer circuit 83 shown in FIG. 8, and is supplied to the other input terminal of a NOR gate 98 shown in FIG. 9 (to be described later).

Note that the synchronization clock signal SIRQCK is generated on the basis of, e.g., an oscillator (14.31818 MHz) normally used in the AT architecture specifications. In this case, one cycle requires 69.8 ns, and one frame requires 838 ns. Therefore, the time required for transferring generation of an interrupt to the PIC 25 is 139.6 ns+' in the shortest case, or is 977.2 ns-' in the longest case. Each of the High- and Low-pulse widths of an interrupt signal requires at least 69.8 ns+'.

Figure 9:
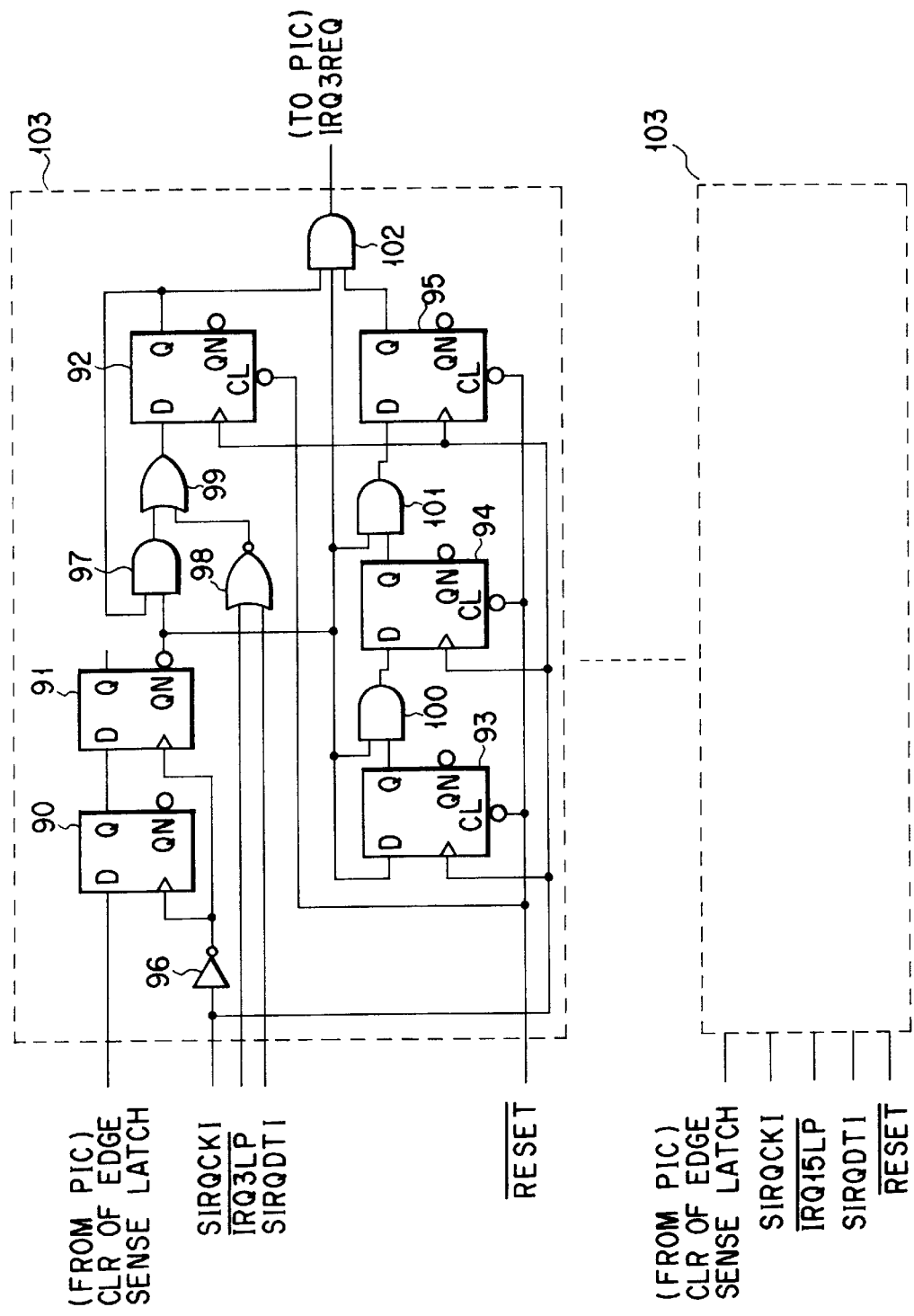
FIG. 9 is a circuit diagram showing a logic circuit which is arranged in the interrupt decoder IDEC and generates an internal interrupt request to be supplied to a programmable interrupt controller on the basis of the leading edge information of an interrupt signal.

FIG. 9 shows an example of a logic circuit for generating an internal interrupt request (IRQx) to the PIC 25 on the basis of the leading edge information of each interrupt. That is, this logic circuit comprises flip-flops 90 through 95, an inverter 96, AND gates 97 and 100 through 102, a NOR gate 98, and an OR gate 99. In FIG. 9, CESL (CLR of EDGE SENSE LATCH) is the timing signal for clearing an edge sense latch as the internal timing signal of the PIC 25 generated upon setting of the corresponding bit of the ISR.

Logic circuits 103 shown in FIG. 9 are arranged in correspondence with interrupt signals, as shown in FIG. 14, and these circuits receive serial data (SIRQDTI) from the IENCs 4 and 5 and the corresponding interrupt latch pulses (IRQ3LP(-) through IRQ15LP(-)) generated by the logic circuit shown in FIG. 8. As a result, these logic circuits 103 convert the serial interrupt data into parallel interrupt data (IRQ3 through IRQ15) and supply the parallel data to the PIC 25.

The logic circuit 103 for the interrupt signal IRQ3 will be exemplified below. However, the same applies to the arrangements and operations of the logic circuits 103 for other interrupt signals (IRQ4 through IRQ15).

As described above, the other input terminal of the NOR gate 98 receives the serial interrupt data (SIRQDTI). The serial interrupt data (SIRQDTI) is also parallelly supplied to the other input terminal of the NOR gate 98 of each of the logic circuits 103 for the remaining interrupt signals (IRQ4 through IRQ7, IRQ9 through IRQ12, IRQ14, and IRQ15) (see FIG. 14). One input terminal of the NOR gate 98 receives the latch pulse (IRQ3LP(-)) for the interrupt signal IRQ3. Also, the corresponding interrupt signal latch pulse is input to one input terminal of each of the remaining NOR gates 98.

For example, in the logic circuit shown in FIG. 9, assuming that an interrupt signal IRQ3 is generated, since Low-level serial data corresponding to IRQ3 is supplied to the NOR gate 98, the NOR gate 98 supplies a High-level signal to the input terminal of the F/F 92 via the OR gate 99 in response to a latch pulse (IRQ3LP(-)). The F/F 92 latches the High-level signal in response to a clock signal (SIRQCKI) output via the input buffer 66 shown in FIG. 6. The latched signal is output to the PIC 25 as an interrupt signal IRQ3REQ via an AND gate 102.

The timing of the trailing edge of the signal IRQ3REQ is synchronized with the clear signal (CLR OF EDGE SENSE LATCH) of the edge sense latch generated upon setting of the corresponding bit of the ISR (In-Service Register) arranged in the PIC 25. More specifically, in FIG. 9, the signal CLR OF EDGE SENSE LATCH is supplied to the F/Fs 90 and 91, and the F/F 91 supplies a Low-level signal from its QN terminal to the AND gate 102. As a result, the output from the AND gate 102 changes from Low level to High level.

FIG. 10 shows a logic circuit for generating an idle cycle of the secondary bus lines 3A and 3B by detecting the idle cycle of the primary bus lines 2A and 2B, and generating latch pulses for the interrupt serial data of the secondary bus lines 3A and 3B. The circuit shown in FIG. 10 is similar to those shown in FIGS. 6 and 8. In this case, the IBRG 6 generates an idle cycle earlier by one cycle than the idle cycle (cycle 1) of the primary bus lines 2A and 2B on the basis of the idle cycle of the primary bus lines 2A and 2B, and outputs it to the secondary bus lines 3A and 3B (see FIG. 5). For this reason, as shown in FIG. 10, serial data (pSIRQDTI) from the primary bus lines 2A and 2B is input to the LOAD terminal of the counter 63 via the inverter 60 and the NOR gate 61. The synchronization circuit for the IDEC 1 shown in FIG. 8 outputs the Q output of the F/F 70-0 as serial data (SIRQDT). However, the IBRG 6 uses the Q output from the F/F 70-11 before the F/F 70-0 so as to generate an idle cycle earlier by one cycle than the idle cycle of the primary bus lines 2A and 2B. That is, the Q output of the F/F 70-11 is output to the secondary bus lines 3A and 3B as serial data sSIRQDTI via the I/O buffer circuit 83.

FIG. 11 shows a logic circuit for transferring interrupt serial data from the secondary bus lines 3A and 3B to the primary bus lines 2A and 2B. Interrupt serial data (sSIRQDTI) from the secondary bus lines 2A and 2B is supplied to the D input terminal of an F/F 113 via an OR gate 111. The F/F 113 latches the input data in synchronism with a clock signal (pSIRQCK) of the primary bus lines 2A and 2B, and outputs the latched data to the primary bus lines 2A and 2B as serial interrupt data (pSIRQDTI) via the I/O buffer circuit 83 in response to the next clock signal (pSIRQCK). As a result, the interrupt serial data from the secondary bus lines 3A and 3B is output to the primary bus lines 2A and 2B while being delayed by one cycle by the F/F 113.

As described above, according to this embodiment, in the system adopting, e.g., the AT architecture specifications, 11 interrupt signals IRQ3 through IRQ7, IRQ9 through IRQ12, IRQ14, and IRQ15 assigned to purposes other than the interrupt signals inside the system are converted into serial data SIRQDT, and the serial data SIRQDT is serially transferred to the PIC. Therefore, when the 11 interrupt signals are to be transferred from the DS 23 as an expansion unit of the system, all the assigned interrupt signals can be transferred to the PIC using the serial data bus consisting of two signal lines including a serial clock signal line.

With this technique, in the connection interface for connecting the system main body and the DS 23, the number of signal lines (11 signal lines) used for interrupt signal lines can be greatly reduced from that of the docking connector 22. Therefore, limitations on use of the number of signals in the docking connector 22 can be consequently relaxed, and the use range can be broadened. When interrupt signal lines are to be arranged on the circuit board in the system main body, since the number of signal lines can be greatly reduced, the design and manufacturing process can be simplified.

Since this embodiment assumes the system adopting the AT architecture specifications, the PIC 25 recognizes generation of an interrupt in the edge trigger mode. However, the present invention may be applied to other modes (e.g., a level trigger mode) as long as they can be used.

In the above embodiment, only the leading edge information of each interrupt signal (original signal) is transferred. That is, the trailing edge of the interrupt signal is ignored. This assumes the characteristics of the AT architecture and the use of the PIC in the edge trigger mode. Although no problem arises in a normal operation in this mode, some problem may occur in a specific case. For example, the CPU is in an interrupt inhibition state, or an interrupt signal temporarily changes from Low level to High level and returns to Low level (a case of inserting/removing a hot line such as a plug-and-play) while the inside of the PIC is masked. In this case, the PIC input interrupt signal (the interrupt signal input to the PIC upon decoding) is kept latched at High level because its trailing edge at which the signal changes to High level is ignored due to the transfer of the first leading edge (i.e., a clear signal of an edge sense latch is not generated due to masking). Therefore, the interrupt signal becomes different from an original signal (at Low level). If the PIC receives an interrupt in this state, interrupt processing is performed (because the interrupt signal is latched at High level). This interrupt processing is not originally performed. Some applications cannot process such sudden interrupts, posing a problem.

According to the second embodiment, trailing edge information is also transferred.

The second embodiment can be realized together with the first embodiment (though an IDEC must correspond to the second embodiment). In the second embodiment, the frequency of SIRQCK is set ½ the frequency in the first embodiment.

In the second embodiment, a mode of transferring the "level" of an original signal is prepared, which corresponds to the level trigger mode. A PIC of the second embodiment is constituted to select the edge trigger mode or the level trigger mode for each interrupt signal. That is, the PIC is constituted to use only a specific interrupt signal in the level trigger mode. This function is provided to map an interrupt signal (INTA #A–#D) on a PCI bus to the PIC. In the level trigger mode, one interrupt signal can be shared by wired-OR of a plurality of displays. Also in the second embodiment, the interrupt signal corresponds to an operation equivalent to the wired-OR on a serial data bus. Note that both edge transfer and level transfer cannot be performed for one interrupt signal. The "edge" or "level" transfer mode is selected for each interrupt signal (i.e., this selection coincides with the selection of the transfer mode of the PIC itself for each interrupt signal). Since the AT architecture is constituted to operate in the edge trigger mode, it does not use the level trigger mode. For this reason, the level trigger mode is used for architectures except for the AT architecture.

FIGS. 15A through 15F are timing charts showing various signals in an expansion serial interrupt transfer mode according to the second embodiment. FIG. 15A shows a serial clock signal (SIRQCK), whose frequency is ½ the frequency of the serial clock signal (SIRQCK; e.g., 14,31818 MHz). FIG. 15B shows serial interrupt data (SIRQDT) for generating a synchronization cycle. FIG. 15C is a timing chart showing serial interrupt data (SIRQDT) in a compatible format, i.e., when leading edge information and trailing edge information are transferred. FIG. 15D is a timing chart showing serial interrupt data (SIRQDT) in the level mode. FIG. 15E is a timing chart showing input of an interrupt signal IRQ5 to a PIC 25 in response to transition of level data shown in FIG. 15D, and input of IRQ14 to the PIC 25 in response to trailing edge data shown in FIG. 15C. FIG. 15F is a timing chart showing the input timing of an interrupt signal IRQ7 to the PIC 25 in response to leading edge data shown in FIG. 15C, and the clearance timing of an edge sense latch.

As is apparent from the above timings, the trailing edge information of an interrupt signal can also be transferred in this embodiment (only leading edge information is transferred in the first embodiment). Further, a mode of transferring the level information of the interrupt signal is provided (the edge or level mode can be selected in units of interrupt signals). Only leading edge information can be transferred as in the first embodiment (upward compatibility though the transfer rate decreases to half).

Figure 20:
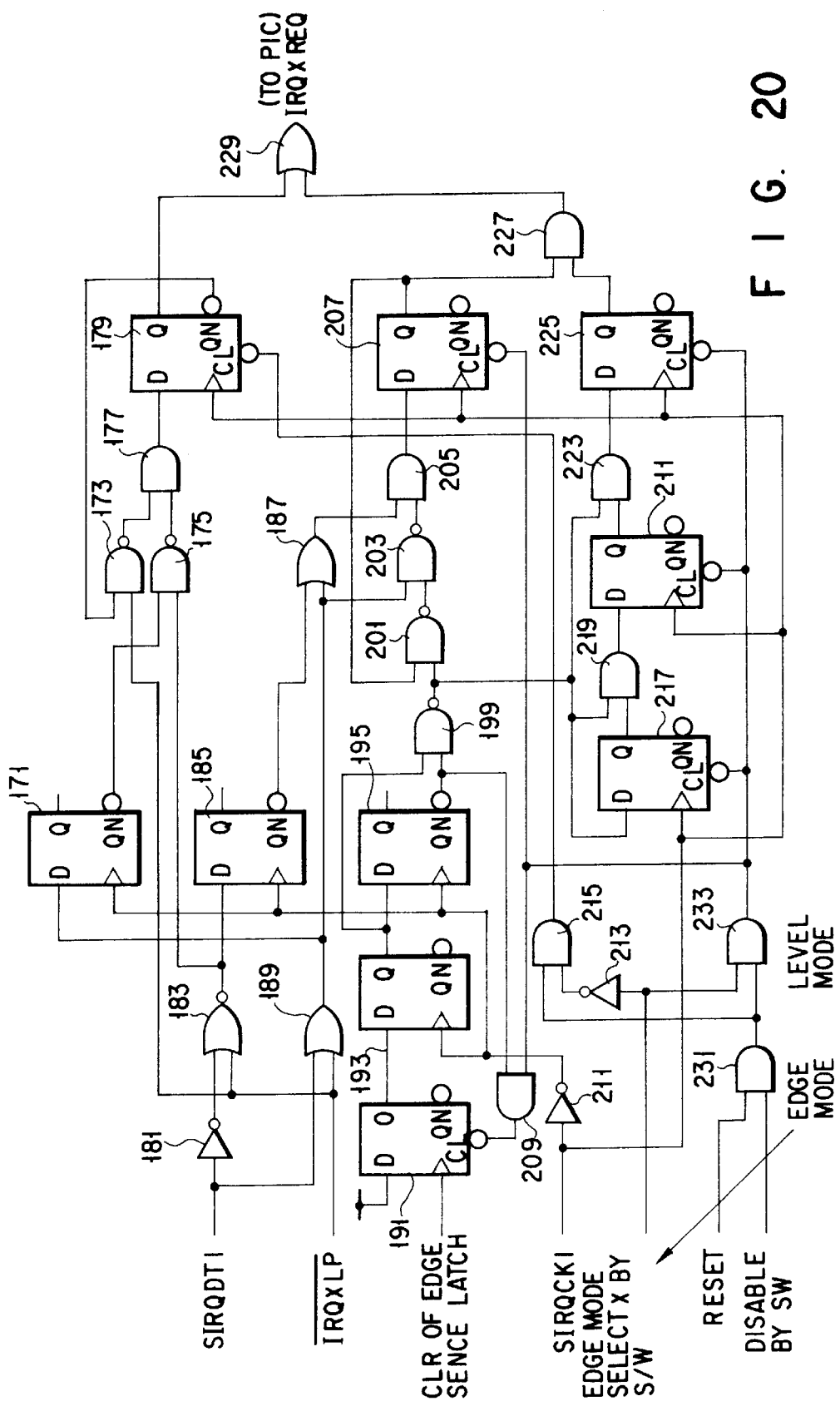
FIG. 20 is a circuit diagram showing a logic circuit for generating an internal interrupt request to the PIC on the basis of the edge or level information of each interrupt in the second embodiment.

As described above, in this embodiment, both the edge and level modes can be used in one frame in units of interrupt signals. For this reason, a register (not shown) can determine in advance the operation mode of a signal between an IENC and an IDEC. More specifically, as shown in FIGS. 18 and 20, an edge mode select line is arranged. A bit representing "the edge mode" or "the level model" is added to each IREQ. Since independent circuits are arranged in correspondence with respective interrupt signals, the mixing transfer of edge information and level information in the same frame is possible (even if a "level interrupt" of another interrupt signal is generated during an interval from rising of a given interrupt signal to transfer of the trailing edge information of the interrupt signal).

In this embodiment, the first half (High period) and second half (Low period) of a serial clock signal (SIRQCK) are distinguished from each other. Serial interrupt data (SIRQDT) is driven (Low)/is not driven (Hi-Z) for the respective periods, thereby transferring various states. FIG. 22 shows combinations of Low and Hi-Z. As shown in FIG. 22, when the serial interrupt data (SIRQDT) is at a high impedance (Hi-Z) in both the first and second halves, it represents "no change" in the edge mode and "level 1" in the level mode. When SIRQDT is at Low in the first half and at Hi-Z in the second half, it represents "–" (it means that SIRQDT is not present) in the edge mode and "level 0" in the level mode. "No change" means that data of High or Low level is continuously output, but it does not show High or Low. Note that the Hi-Z is actually pulled up, so that the data is at High level.

When SIRQDT is at Hi-Z in the first half and at Low in the second half, it represents a "trailing edge" in the edge mode and "undefined" in the level mode. When SIRQDT is at Low in both the first and second halves, it represents a "trailing edge (or synchronized data)" in the edge mode and "synchronized data" in the level mode.

In the edge mode, after sampling "leading edge data", the IDEC drives a corresponding internal IRQ signal (signal input to the PIC 25) to High level. After sampling "trailing edge data", the IDEC drives a corresponding internal IRQ signal to Low level. Further, upon reception of a clear signal of an edge sense latch generated in the PIC 25, the IDEC drives a corresponding internal IRQ signal to Low level (to cope with the first embodiment).

In the level mode, only while sampling data of "level 0", the IDEC drives a corresponding internal IRQ signal to Low level. When the IDEC samples another data, it drives a corresponding internal IRQ signal to High level.

In transmitting a signal in the edge mode, the IENC must reliably detect the trailing edge to transmit "trailing edge data". In other words, it is allowable to fail to transfer a very short Low High Low pulse (called a High pulse). The very short pulse has a pulse width not to be sampled at a sampling clock for parallel-serial conversion of the IDEC. A Low pulse has priority over a High pulse on the basis of the internal arrangement of the PIC itself. That is, the PIC itself has an internal arrangement capable of detecting a very short Low pulse. In transmitting a signal in the level mode, since its state can only be transmitted in a frame unit, an interrupt signal which is generated and converges in one frame cannot be transmitted. More specifically, even if the interrupt signal IRQ7 changes from "High" to "Low" in a frame "n", as indicated by a broken line in FIG. 23B, the interrupt signal returns to "High" in cycle 6 of the next frame "n+1". For this reason, this state ("Low" of IRQ7) cannot be transferred. Therefore, a target signal must be stable over one frame or more.

An IBRG has a structure to transfer all data on a secondary bus to a primary bus by using the two edges of SIRQCK.

For example, a waveform which appears first in FIG. 15C (a waveform which appears in correspondence with cycle 6 of the frame "n") is at "Low" in both the first and second halves of SIRQDT. Therefore, this waveform represents the leading edge information of the interrupt signal IRQ7. A waveform which appears second in FIG. 15C (i.e., a waveform which appears in correspondence with cycle 11 of the frame "n") is at "High" in the first half of SIRQDT and at "Low" in the second half. Therefore, this waveform represents the "trailing edge" information of the interrupt signal IRQ14. FIGS. 23A through 23D are timing charts showing the transfer timings of the "leading" edge information, "trailing" edge information, and level information of the interrupt signal IRQ7 in the edge and level modes. When the interrupt signal IRQ7 rises in a frame "n−1", as shown in FIGS. 23A and 23B, the "leading edge" information ("Low" in both the first and second halves of SIRQDT) is generated in cycle 6 corresponding to the interrupt signal IRQ7 in the frame "n", as shown in FIG. 23C. Since this interrupt signal IRQ7 is at "High" level also in cycle 6 of the next frame "n+1", information representing "no change" ("High" in both the first and second halves of SIRQDT) is generated, as shown in FIG. 23C. Since this interrupt signal IRQ7 is still at "High" level also in cycle 6 of the next frame "n+2", information of "no change" ("High" in both the first and second halves of SIRQDT) is generated, similar to the case of the frame "n+1". Since the interrupt signal IRQ7 falls in cycle 7 of the frame "n+2", information representing "the trailing edge" ("High" in the first half of SIRQDT and "Low" in the second half) is generated in cycle 6 of the next frame "n+3". Since the interrupt signal IRQ7 changes again to "High" in a cycle earlier than cycle 6 of a frame "n+4", information representing "the leading edge" ("Low" in both the first and second halves of SIRQDT) is generated.

On the other hand, in the level mode, information representing "level 1" ("High" in both the first and second halves of SIRQDT) is generated in cycle 6 of the frame "n", as shown in FIG. 15D. Information representing "level 1" ("High" in both the first and second halves of SIRQDT) is generated also in cycle 6 of each of the frames "n+1" and "n+2". Information representing "level 0" ("Low" in the first half of SIRQDT and "High" in the second half) is generated in cycle 6 of the frame "n+3". Since the interrupt signal IRQ7 rises in cycle 6 of the next frame "n+4", information representing "level 1" ("High" in both the first and second halves of SIRQDT) is generated.

The transfer modes in the second embodiment can be used together with the transfer mode in the first embodiment (only "leading edge" information is transferred). To attain compatibility between the transfer modes in the first and second embodiments (to avoid confusion of the transfer modes of the first and second embodiments), "leading edge" information is set to "Low" in both the first and second halves of SIRQDT also in the second embodiment. In the transfer mode of the second embodiment, "trailing edge" information is at "High" in the first half of SIRQDT and at "Low" in the second half. Such a waveform is not present in the transfer mode of the first embodiment (both the first and second halves of SIRQDT are always at "Low" or "High"). Therefore, a waveform which changes its level in the first and second halves of SIRQDT can be determined to be the transfer mode of the second embodiment.

In the first embodiment, the IDEC resets an interrupt signal by using a clear signal of an edge sense latch, as shown in FIGS. 24A and 24B. In the second embodiment, the interrupt signal is reset by both trailing edge information and the clear signal of the edge sense latch, as shown in FIGS. 24C and 24D.

Generation (IDEC) and detection (IENC/IBRG) of an expansion idle cycle in the second embodiment are the same as those in the first embodiment.

FIGS. 16A and 16B are timing charts showing an expansion request cycle in the second embodiment. The expansion request cycle is the same as that in the first embodiment except that the first half (High period) and the second half (Low) of SIRQCK are distinguished from each other, and SIRQDT is driven (Low)/is not driven (Hi-Z) for the respective periods, thereby transferring various states.

FIGS. 17A through 17D are timing charts showing a primary serial interrupt signal (pSIRQCK), primary serial interrupt data (pSIRQDT), a secondary serial interrupt signal (sSIRQCK), and secondary serial interrupt data (sSIRQDT) in an expansion bridge, respectively. Processing in the second embodiment is the same as that in the first embodiment except that the expansion bridge transfers data on a secondary bus to a primary bus by using the two edges of SIRQCK.

FIG. 18 is a circuit diagram showing an expansion IENC in the second embodiment. The expansion IENC has the following functions.

(1) The expansion IENC detects an idle cycle to establish synchronization.

(2) The expansion IENC selects the edge or level mode for each interrupt line.

(3) The expansion IENC reliably detects the trailing edge of an interrupt signal (even the very short Low pulse) in the edge mode and transmits it as "trailing edge data".

(4) In the edge mode, until transmission of "trailing edge" data is completed after the trailing edge is detected, the expansion IENC does not transmit leading edge information generated during this period (the expansion IENC latches the information and transmits it in a frame next to the frame in which the "trailing edge data" has been transmitted).

(5) Until transmission of "leading edge" data is completed after the leading edge is detected, the expansion IENC does not transmit trailing edge information generated during this period (the expansion IENC latches the information and transmits it in a frame next to the frame in which the "leading edge data" has been transmitted).

(6) In the level mode, the expansion IENC detects the level of an interrupt signal and transmits it as "data of level 0".

(7) The expansion IENC independently performs edge detection and level detection in units of interrupt lines.

(8) SIRQDT output from the IENC (open-drain output) rises at high speed (Low High Hi-Z).

Note that a logic for detecting an idle cycle to generate a latch pulse for each interrupt signal is the same as that in the first embodiment.

The operation of a logic circuit, shown in FIG. 18, for detecting the edge or level of an interrupt signal and outputting it to SIRQDT will be described below.

More specifically, the logic circuit shown in FIG. 18 comprises a bistable multivibrator 125 constituted by NAND gates 121 and 123, flip-flops (F/Fs) 127, 129, 133, 137, 141, 145, and 149, AND gates 131, 139, 159, 161, and 167, NAND gates 135 and 143, inverters 147 and 151, OR gates 153, 155, and 157, a delay circuit 165, and I/O buffer circuits 163 and 169.

(Level Mode)

In the level mode, an edge mode select signal is at level "0". The signal of level "0" is supplied to the preset terminals (PRs) of the F/Fs 137 and 145 to preset both the F/Fs 137 and 145. Since the respective D input terminals of the F/Fs 137 and 145 are pulled up, "1"s are set to the F/Fs 137 and 145, respectively. The Q output terminals of the F/Fs 137 and 145 supply signals of High level to the OR gates 153 and 155, respectively. Therefore, in the level mode, a logic circuit constituted by the AND gate 131, the F/F 133, the NAND gate 135, and the F/F 137, and a circuit constituted by the AND gate 139, the F/F 141, the NAND gate 143, and the F/F 145 are not operated (not significant).

On the other hand, the first input terminal of the OR gate is connected to the QN output terminal of the F/F 129, the second input terminal receives a latch pulse IRQxLP(-) of an interrupt signal, and the third input terminal is connected to the QN output terminal of the F/F 149.

Assuming that IRQxIN is at High level, if the other input terminal of the NAND gate 121 is at High level, the NAND gate 121 outputs a Low-level signal. The NAND gate 123 outputs a High-level signal to stabilize the bistable multivibrator 125. The bistable multivibrator 125 supplies a Low-level signal to the D input terminal of the F/F 127 to latch the Low-level signal. The F/F 127 supplies a Low-level signal from its Q output terminal to the D input terminal of the F/F 129 in synchronism with the next clock. The F/F 129 outputs a High-level signal from its QN output terminal to the first input terminal of the OR gate 157 at the next clock. Therefore, a circuit constituted by the bistable multivibrator 125, the F/Fs 127 and 129 does not operate.

When IRQxIN changes to Low level at given time, an output from the NAND gate 125 changes to High level, and an output from the NAND gate 123 changes to Low level. An output from the bistable multivibrator 125 becomes stable at High level. This High-level signal is latched by the F/F 127 and transferred to the F/F 129. The F/F 129 supplies a Low-level signal from its QN output terminal to the first input terminal of the OR gate 157. To the contrary, since IRQLP(-) is normally at High level, the F/F 149 latches a High-level signal. When IRQLP(-) changes to Low level, a Low-level signal is supplied to the second input terminal of the OR gate 157, a Low-level signal is supplied from the QN terminal of the F/F 149 to the third input terminal of the OR gate 157. Therefore, the OR gate 157 output a Low-level signal. This Low-level signal is output as Low-level SIRQDT via the AND gates 159 and 161 and the I/O buffer circuit 169.

As described above, when information of level "0" is serially transferred in the level mode, interrupt serial data (SIRQDT) is at "Low" in the first half and at "High" in the second half. An interrupt latch pulse IRQxLP(-) shown in FIG. 25B is inverted and latched by the F/F 149 to obtain a waveform shown in FIG. 25C. The waveform of IRQxLP(-) shown in FIG. 25B and the QN output of the F/F 149 shown in FIG. 25C are ORed by the OR gate 157 to obtain a signal waveform at "Low" in the first half and at "High" in the second half.

(Edge Mode)

In the edge mode, an edge mode select signal representing "1" is supplied to the negative input clear terminal of the F/F 149 via the inverter 151 to reset the F/F 149. A signal of "1" is supplied from the QN output terminal to the third input terminal of the OR gate 157. As a result, a logic circuit constituted by the inverter 151, the F/F 149, and the OR gate 157 does not operate. In addition, the edge mode select signal of "1" is supplied to the respective negative input preset terminals (PRs) of the F/Fs 137 and 145 to reset the preset states of the F/Fs 137 and 145. Further, since the edge mode select signal of "1" is supplied to the three-input AND gates 131 and 139, the AND gates 131 and 139 serve as the two-input gates 131 and 139.

The bistable multivibrator 125 operates like in the level mode. More specifically, assuming that IRQxIN is at High level, when the other input terminal of the NAND gate 121 is at High level, the NAND gate 121 outputs a Low-level signal. Accordingly, the NAND gate 123 outputs a High-level signal to stabilize the bistable multivibrator 125.

In a normal state, a latch pulse (IRQxLP(-)) always appears at a predetermined position in each frame. Therefore, clocks are always supplied to the respective clock input terminals of the F/Fs 137 and 145. In addition, signals of logic "1" (High level) are always supplied to the respective D input terminals of the F/Fs 137 and 145. As a result, High-level signals are output from the respective Q output terminals of the F/Fs 137 and 145 and supplied to the respective input terminals of the OR gates 153 and 155. For this reason, both outputs from the OR gates 153 and 155 are at High level. The Q output (High level) of the F/F 137 is input to the AND gate 139, whereas the Q output (High level) of the F/F 145 is input to the AND gate 131.

The first input terminal of the AND gate 139 receives a High-level signal from the Q output terminal of the F/F 137, the second input terminal receives an edge mode select signal of High level, and the third input terminal receives a High-level signal from the QN terminal of the F/F 129. As a result, the AND gate 139 outputs a High-level signal. The D input terminal of the F/F 141 receives a High-level signal from the AND gate 139, and the clock input terminal receives a serial clock signal SIRQCKI via the inverter 147. The QN output terminal of the F/F 141 outputs a Low-level signal. The first input terminal of the NAND gate 143 receives a High-level signal from the AND gate 139, and receives a Low-level signal from the QN output terminal of the F/F 141. As a result, the NAND gate 143 outputs a High-level signal. Since the negative input clear terminal of the F/F 145 receives a High-level signal, the F/F 145 is not cleared.

On the other hand, the first input terminal of the AND gate 131 receives a Low-level signal from the F/F 129, the second input terminal receives an edge mode select signal of High level, and the third input terminal receives a High-level signal from the Q output terminal of the F/F 145. The AND gate 131 outputs a Low-level signal. The F/F 133 latches the Low-level signal from the AND gate 131 in response to an inverted signal of the serial clock signal SIRQCKI. The F/F 133 outputs a High-level signal from its QN terminal at the next clock. The first terminal of the AND gate 135 receives the Low-level signal from the AND gate 131, and the second input terminal receives the High-level signal from the QN terminal of the F/F 133. The AND gate 135 outputs a High-level signal. Since the negative input clear terminal of the F/F 137 receives the High-level signal, the F/F 137 is not cleared.

When an interrupt signal IRQxIN of Low level is input to the NAND gate 121, the NAND gate 121 outputs a High-level signal. The first input terminal of the NAND gate 123 receives a High-level signal from the NAND gate, and the second input terminal receives a High-level signal from the QN terminal of the F/F 129. The NAND gate 123 outputs a Low-level signal. Since the Low-level terminal from the NAND gate 123 is supplied to the second input terminal of the NAND gate 121, the NAND gate 121 outputs a High-level signal. As a result, the bistable multivibrator 125 outputs a High-level signal and is stabilized.

The first logic circuit constituted by the AND gate 131, the F/F 133, the NAND gate 135, and the F/F 137 is symmetrical to the second logic circuit constituted by the AND gate 139, the F/F 141, the NAND gate 143, and the F/F 145. The first logic circuit receives the Q output of the F/F 129, and the second logic circuit receives the QN output thereof. When one logic circuit is at Low level, the other logic circuit is at High level.

When an interrupt signal (IRQxIN) of Low level is input to the bistable multivibrator 125, an output from the bistable multivibrator 125 changes to High level, the Q output of the F/F 129 changes to High level, and the QN output changes to Low level. An output from the NAND gate 139 changes to Low level, and a QN output from the F/F 141 changes to High level. As a result, an output from the NAND gate 143 remains at High level. Therefore, the second logic circuit does not operate.

On the other hand, the first input terminal of the AND gate 131 receives a High-level signal from the Q output terminal of the F/F 129, the second input terminal receives an edge mode sense latch signal of High level, and the third input terminal receives a High-level signal from the Q output terminal of the F/F 145. The AND gate 131 outputs a High-level signal. The first input terminal of the NAND gate 135 receives the High-level signal from the AND gate 131. Since the F/F 133 latches a Low-level signal, the F/F 133 supplies a High-level signal from its QN terminal to the second input terminal of the NAND gate 135. The NAND gate 135 inputs a Low-level signal to the clear terminal (CLR) of the F/F 137 to reset the F/F 137 in response to the next clock signal. As a result, the Q output of the F/F 137 changes to Low level. This Low-level signal is input to the OR gate 153. The OR gate 153 performs OR processing for a serial clock signal (SIRQCKI) shown in FIG. 26A and an interrupt latch pulse (IRQxLP(–)) shown in FIG. 26B to obtain an OR output shown in FIG. 26C. Further, a signal as an output from the F/F 137 is ORed, and a signal waveform shown in FIG. 26D ("High" in the first half and "Low" in the second half) is output as "trailing edge" information.

As described above, the first input terminal of the OR gate 155 receives a signal of High level (logic "1") from the Q output terminal of the F/F 145. The third input terminal of the OR gate 157 receives a High-level signal from the QN output terminal of the F/F 149. For this reason, the AND gate 159 passes an output ("High" in the first half and "Low" in the second half) from the OR gate 153 therethrough.

A Low-level signal from the Q output of the F/F 137 in the first logic circuit is supplied to the first input terminal of the AND gate 139 in the second logic circuit. Upon reception of this signal, the operation of the second logic circuit is stopped. A clock is input to the F/F 137 at the trailing edge of a latch pulse (IRQxLP). A High-level signal is fed back from the Q output of the F/F 137 to the second logic circuit to cancel the stop of the operation of the second logic circuit. Therefore, the second logic circuit can receive the next interrupt request. In this manner, a signal from the first logic circuit is fed back to the second logic circuit, or a signal from the second logic circuit is fed back to the first logic circuit to stop the operation of one logic circuit during the operation of the other logic circuit.

When IRQxIN changes from "Low level" to "High level", an output from the bistable multivibrator 125 changes to Low level. This Low-level signal is input to the first input terminal of the AND gate 131 via the F/Fs 127 and 129. A Low-level signal from the AND gate 131 is supplied to the first input terminal of the NAND gate 135 and at the same time latched by the F/F 133. A High-level signal is input from the QN terminal of the F/F 133 to the other input terminal of the AND gate 135. The NAND gate 135 inputs a High-level signal to the negative input clear terminal of the F/F 137. As a result, the F/F 137 outputs a High-level signal from its Q output terminal in response to the next clock signal and supplies it to the first input terminal of the AND gate 139 in the second logic circuit. Since a High-level signal is supplied to the first through third input terminals of the AND gate 139, the second logic circuit operates, whereas the operation of the first logic circuit is stopped. In the second logic circuit, the AND gate 139 inputs a High-level signal to the first input terminal of the NAND gate 143. Since the F/F 141 latches a Low-level signal, a High-level signal is input from the QN terminal to the second input terminal of the NAND gate 143. The NAND gate 143 supplies a Low-level signal to the negative input clear terminal of the F/F 145 to reset the F/F 145. A Low-level signal is input from the Q output terminal to the OR gate 155 and ORed with a latch pulse (IRQxLP(–)). As a result, a signal waveform of "Low" in both the first and second halves of a serial clock (SIRQCKI) is output as "leading edge" information, as shown in FIG. 27D. The second logic circuit is reset at the trailing edge of a latch pulse (IRQxLP (–)) and set in a state capable of receiving the next interrupt signal.

The bistable multivibrator 125 is a circuit for reliably detecting even the "trailing edge" of a very short interrupt signal which cannot be sampled by a clock signal.

More specifically, when an interrupt signal is at High level, a High-level signal is input to the first input terminal of the NAND gate 121, as shown in FIG. 28A. When a Low-level signal is input to the second input terminal of the NAND gate 121, an output from the NAND gate 121 changes to High level. The first input terminal of the NAND gate 123 receives a High-level signal, and the second input terminal receives a Low-level signal from the QN terminal of the F/F 129. As a result, the NAND gate 123 outputs a High-level signal. Since the second input terminal of the NAND gate 121 receives a High-level signal, the NAND gate 121 outputs a Low-level signal to the first input terminal of the NAND gate 123. The NAND gate 123 outputs a High-level signal to stabilize the bistable multivibrator. When the signal changes to Low level, as shown in FIG. 29B, the first input signal of the NAND gate 121 changes from High level to Low level, and the NAND gate 121 outputs a High-level signal, as shown in FIG. 28B. The first input signal of the NAND gate 123 changes from Low level to High level, while the second input signal remains at High level. Therefore, the NAND gate 123 outputs a Low-level signal. Even if IRQxIN rapidly returns to High level in this state, as shown in FIG. 29B, the signal is internally latched at Low level. Since the two pulses of SIRQCKI at the leading and trailing edges are removed by the F/Fs 127 and 129, a High-level signal is fed back from the QN terminal of the F/F 129 to the bistable multivibrator 125, and the bistable multivibrator 125 outputs a High-level signal. Accordingly, the Q output of the F/F 129 outputs a High-level signal, as shown in FIG. 29D.

Assume that a very short High pulse is generated, as shown in FIG. 30B. As shown in FIG. 31A, since a Low-level signal is supplied to the first input terminal of the NAND gate 121 in a Low-level state before generation of a High pulse, an output from the NAND gate 121 changes to High level. The first input signal of the NAND gate 123 is at High level, and the second input signal is at High level because a signal output from the QN terminal of the F/F 129 is at Low level. The circuit is stable in this state. If the signal changes to High level, as shown in FIG. 30B, the first input signal of the NAND gate 121 changes to High level, and the second input signal is at High level, as shown in FIG. 31B. Therefore, the NAND gate 121 outputs a Low-level signal. The first input signal of the NAND gate 123 changes to Low level, while the second input signal remains at Low level. Therefore, the output remains at High level. Since a serial clock signal (SIRQCKI) inverted via the invertor 147 is supplied to the clock input terminal of the F/F 127, the F/F 127 does not receive an output from the bistable multivibrator 125. Since the signal rapidly changes to Low level, as shown in FIG. 30B, the first input signal of the NAND gate 121 returns from High level to Low level, and its output returns to High level, as shown in FIG. 31A. Therefore, a very short High pulse as shown in FIG. 30B is not sampled by the bistable multivibrator 125. That is, this circuit ignores a signal upon falling of a serial clock signal (i.e., the clock input terminal of the F/F 127 receives a clock signal via the inverter 147), as shown in FIG. 18. For this reason, as shown in FIG. 30C, although the F/F 127 latches an interrupt signal of a short High pulse generated upon falling of a clock signal, the F/F 127 does not latch an interrupt signal of a short High pulse generated in the middle of a clock.

FIG. 19 is a circuit diagram showing a logic circuit arranged in the expansion IDEC to generate a synchronization clock (SIRQCK). FIG. 20 is a circuit diagram showing a logic circuit arranged in the expansion IDEC to generate an internal interrupt request to the PIC on the basis of the edge or level information of each interrupt signal.

The expansion IDEC has the following functions.

(1) The expansion IDEC generates a synchronization clock (continuously output during a reset period).

(2) The expansion IDEC generates an idle cycle.

(3) In the edge mode, when "leading edge data" is sampled, the expansion IDEC generates an internal interrupt request to a corresponding PIC (active=High) to sample "trailing edge data", or cancels the internal interrupt request (inactive=Low) by a clear signal to an edge sense latch in the PIC.

(4) In the level mode, the expansion IDEC drives a corresponding internal interrupt signal to Low level only while "data of 0 level" is sampled (in each frame), and to High level in other frames. (In the level mode, the internal interrupt request to the PIC gives the inverted value of the internal interrupt signal generated in this frame.)

(5) SIRQDT (open drain output) output from the IDEC rises at higher speed (Low High Hi-Z).

The circuit operation of the logic circuit shown in FIG. 20 will be described below.

In the circuit shown in FIG. 20, a "DISABLE" signal is used, which is a signal to reset interrupt processing in a software manner, instead of a system reset. More specifically, in the first embodiment, as described above, only the leading edge information of each interrupt signal is transferred. Since the inside of the PIC is masked, an interrupt signal temporarily changes from Low level to High level and returns to Low level. In this case, a PIC input interrupt signal is kept latched at High level because the trailing edge at which the signal changes to High level is ignored (is not transferred) due to transfer of the first leading edge (i.e., a clear signal of an edge sense latch is generated due to masking). Therefore, the interrupt signal becomes different from an original signal (at Low level). In this case, according to a reset method, the system is reset. However, in this embodiment, this latch can be canceled by using the DISABLE(-) signal in a software manner.

In the second embodiment, similar to the first embodiment, the two pulses of a clear signal of an edge sense latch are removed upon falling of a clock. That is, an F/F 191 outputs a High-level signal in synchronism with a clear signal of an edge sense latch. An F/F 193 latches the High-level signal from the F/F 191 upon falling of the next clock signal (SIRQCKI). An F/F 195 latches a High-level signal from the F/F 193 upon falling of the next clock signal. At this time, since a Low-level signal is input from the QN terminal of the F/F 195 to the negative input clear terminal (CL) of the F/F 191 via an AND gate 209, the clear signal of the edge sense latch is cleared.

(Edge Mode)

The operation, in the edge mode, of a logic circuit shown in FIG. 20 (a logic circuit for generating an internal interrupt request to the PIC on the basis of the edge or level information of each interrupt) will be described below.

In the edge mode, a signal of High level (logic "1") is supplied to the first input terminal of an AND gate 233, and a Low-level signal is supplied to the second input terminal of an AND gate 215 via an inverter 213. For this reason, a logic circuit constituted by the AND gate 233, AND gates 231, 219, 223, and 227, F/Fs 217, 221, and 225, and an OR gate 229 does not operate.

In the edge mode, when SIRQDT is at High level in the first half and at Low level in the second half, it represents trailing edge information. When SIRQDT is at Low level in both the first and second halves, it represents leading edge information. Assume that trailing edge information is sent. In this case, since a signal SIRQDTI is at High level upon falling of a clock, the signal is changed to Low level by an inverter 181, and the obtained signal is supplied to the first input terminal of a NOR gate 183. At this time, if a latch pulse (IRQxLP(-)) of Low level is supplied to the second input terminal of the NOR gate 183, the NOR gate 183 outputs a High-level signal to the second input terminal of a NAND gate 175. On the other hand, since a clock (SIRQCKI) falls (at Low level), it is changed to High level by an inverter 211, and the obtained signal is supplied to the clock input terminal of an F/F 171. The F/F 171 supplies a High-level signal from its QN terminal to the first input terminal of the NAND gate 175. The NAND gate 175 outputs a Low-level signal to the second input terminal of an AND gate 177. The AND gate 177 outputs a Low-level signal, which is latched by an F/F 179 at the next rising of the clock signal.

The High-level signal from the NOR gate 183 is further latched by an F/F 185.

Upon rising of the clock, SIRQDTI of Low level is supplied to the first input terminal of an OR gate 189. When IRQxLP(-) of Low level is supplied to the second input terminal of the OR gate 189, the OR gate 189 outputs a Low-level signal to the second input terminal of an OR gate 187. Further, since a Low-level signal is supplied from the QN terminal-of the F/F 185 to the first input terminal of the OR gate 187, the OR gate 187 supplies a Low-level signal to an AND gate 205. The AND gate 205 outputs a Low-level signal, which is latched by an F/F 207.

More specifically, when a logic circuit constituted by the F/Fs 171, 179, 185, and 207, a gate 173, and the gates 175, 177, 183, 189, 187, and 205 receives a signal SIRQDT at "High level" in the first half and at "Low level" in the second half, outputs from the F/Fs 179 and 207 change to Low level.

In this state, the first input terminal of the NOR gate 183 receives a High-level signal via the inverter, and the second input terminal receives a Low-level signal. As a result, an output from the NOR gate 183 changes to Low level, and the F/F 185 latches the Low-level signal. The F/F 185 supplies a High-level signal from its QN output terminal to the first input terminal of the OR gate 187. For this reason, the OR gate 187 always outputs a High-level signal.

When IRQxLP(-) of Low level is sent while SIRQDT is at Low level, Low-level signals are supplied to the first and second input terminals of the OR gate 189. As a result, the OR gate 189 supplies a Low-level signal to the second input terminal of a NAND gate 203. The NAND gate 203 supplies a High-level signal to the second input terminal of the AND gate 205. On the other hand, since the F/F 185 latches a Low-level signal, the F/F 185 supplies a High-level signal from its QN terminal to the first input terminal of the AND gate 205. For this reason, the F/F 207 latches a High-level signal at the leading edge of SIRQCKI.

When IRQxLP(-) of Low level is input while SIRQDTI is at Low level, a High-level signal is input to one input terminal of the NOR gate 183 via the inverter 181, and a Low-level signal is input to the other input terminal. Therefore, the output of the NOR gate 183 outputs a Low-level signal. This Low-level signal is supplied to the second input terminal of the NAND gate 175. As a result, the NAND gate 175 supplies a High-level signal to the second input terminal of the AND gate. Further, since a Low-level signal (IRQxLP8-9) is input to the second input terminal of the NAND gate 173, the NAND gate 173 outputs a High-level signal to the first input terminal of the AND gate 177. As a result, the AND gate 177 outputs a High-level signal. The F/F 179 latches this High-level signal upon rising of a clock.

In this manner, when a signal SIRQDT at Low level in both the first and second halves is input, the F/Fs 179 and 207 latch High-level signals. That is, if SIRQDT is at "High" in the first half and at "Low" in the second half, it represents "trailing edge" information; if it is at "Low" in the first half and at "High" in the second half, it represents "leading edge" information.

In the second embodiment, similar to the first embodiment, an interrupt signal is also cleared by a clear signal of an edge sense latch.

More specifically, in this state, a High-level signal is fed back from the Q output of the F/F 207 to the first input terminal of a NAND gate 201. If no clear signal of an edge sense latch is input, the Q output of the F/F 191 is at High level, and the F/Fs 193 and 195 similarly latch High-level signals. Since a Low-level signal is input from the QN terminal of the F/F 195 to a NAND gate 199, the NAND gate 199 outputs a High-level signal to the second input terminal of the NAND gate 201. For this reason, the NAND gate 201 outputs a Low-level signal to the second input terminal of the NAND gate 203. As a result, the NAND gate 203 outputs a High-level signal to the second input terminal of the AND gate 205. Further, since the first terminal of the AND gate 205 receives a High-level signal from the QN terminal of the F/F 185, the AND gate supplies a High-level signal to the D terminal of the F/F 207. Therefore, the F/F 207 latches a High-level signal in a normal state (both SIRQDTI and IRQxLP(-) are at High level).

When the clear signal of an edge sense latch is supplied to the clock input terminal of the F/F 191 in this state, the F/F 191 is cleared by an output from the AND gate 209 to latch a Low-level signal. The F/F 193 outputs a High-level signal to the first input terminal of the NAND gate 199 upon falling of the next clock. At the same time, the F/F 193 latches a Low-level signal from the F/F 191. The F/F 195 latches a Low-level signal from the F/F 193 upon falling of the next clock. When a High-level signal is supplied from the QN terminal of the F/F 195 to the second input terminal of the NAND gate 199, a High-level signal is supplied from the Q output of the F/F 193 to the first input terminal of the NAND gate 199. An output from the NAND gate 199 changes to Low level. Since this Low-level signal is supplied to the NAND gate 201, the NAND gate 201 outputs a High-level signal to the second input terminal of the NAND gate 203. Since a High-level signal is supplied from the OR gate 189 to the first input terminal of the NAND gate 203, the NAND gate 203 outputs a Low-level signal to the AND gate 205. The AND gate 205 supplies a Low-level signal to the D terminal of the F/F 207, and the F/F 207 latches the Low-level signal at the next clock. In this manner, the F/F 207 latches a signal of "Low-level" regardless of transfer of "trailing edge" data or the clear signal of an edge sense latch. The AND gate 227 and the OR gate 229 are circuits for ensuring the minimum pulse width. These circuits restore an interrupt signal transferred as serial information in this manner to an original interrupt signal and supply the original interrupt signal to the PIC as IRQxREQ.

(Level Mode)

In the level mode, an edge mode select signal of Low level is supplied to the AND gate 233. The AND gate 233 supplies a Low-level signal to the negative input clear terminals (CLs) of the F/Fs 217, 221, and 225. For this reason, all the F/Fs 217, 221, and 225 are cleared and do not operate. Further, since the Low-level signal from the AND gate 233 is also supplied to the negative input clear terminal (CL) of the F/F 207, the F/F 207 is also cleared and does not operate. As a result, only a logic circuit constituted by the NOR gate 183, the OR gate 189, the F/F 171, the NAND gates 173 and 175, the AND gate 177, and the F/F 179 operates.

As described above, in the level mode, if SIRQDT is at "High" level in both the first and second halves, it represents level "1"; if it is at "Low" level in the first half and at "High" level in the second half, it represents level "0". In the level mode of "0", a signal SIRQDTI is converted from High level to Low level by the inverter 181, and the obtained signal is input to the OR gate 189. As The OR gate 189 supplies a High-level signal to the D input terminal of the F/F 171. The F/F 171 latches the High-level signal upon falling of a clock (SIRQCKI). As a result, a Low-level signal is supplied from the QN terminal of the F/F 171 to the first input terminal of the NAND gate 175.

On the other hand, SIRQDTI is inverted from High level to Low level via the inverter 181, and the obtained signal is supplied to the first input terminal of the NOR gate 183. The NOR gate 183 supplies a High-level signal to the second input terminal of the NAND gate 175 in response to a latch signal (IRQxLP(-)) of Low level. The NAND gate 175 outputs a High-level signal to the second input terminal of the AND gate 177. Since a latch pulse (IRQxLP(-)) of Low level is supplied to the NAND gate 173, the NAND gate 173 supplies a High-level signal to the first input terminal of the AND gate 177. As a result, the AND gate 177 supplies a High-level signal to the D input terminal of the F/F 179, and the F/F 179 latches the High-level signal upon rising of a clock.

If a latch pulse is at High level, a Low-level signal is supplied from the QN terminal of the F/F 179 to the first input terminal of the NAND gate 173, and a High-level signal is supplied to the second input terminal. Therefore, an output from the NAND gate 173 is at High level. To the contrary, a Low-level signal is supplied from the QN terminal of the F/F 171 to the first input terminal of the NAND gate 175, and a Low-level signal is supplied from the NOR gate 183 to the second input terminal. The NAND gate 175 outputs a High-level signal. That is, the NAND gate 175 operates like an inverter. Since High-level signals are supplied to both the first and second input terminals of the AND gate 177, the AND gate 177 passes the input signals therethrough. Therefore, a signal obtained by inverting an output from the QN terminal of the F/F 171 is input to the D input terminal of the F/F 179. In this state, D=Q in the F/F 179. Therefore, even if a clock is input, the latched state of the Q terminal does not change.

Next, the level mode of "0" will be described. In this case, SIRQDTI is at "Low" in the first half and at "High" in the second half.

When SIRQDTI at "Low level" in the first half is input, the OR gate 189 supplies a Low-level signal to the D input terminal of the F/F 171 in response to a latch pulse (IRQxLP (–)) of Low level. The F/F 171 latches this Low-level signal in synchronism with falling of a clock. As a result, the F/F 171 outputs a High-level signal from its QN terminal to the NAND gate 175. Since SIRQDTI is at "High" level in the second half, it is inverted to Low level by the inverter 181, and the obtained signal is supplied to the NOR gate 183. The NOR gate 183 supplies a High-level signal to the second input terminal of the NAND gate 175 in response to IRQxLP (–) of Low level. Since the NAND gate 175 receives the High-level signals, it outputs a Low-level signal. The AND gate 177 supplies a Low-level signal to the D terminal of the F/F 179. As a result, the F/F 179 outputs a Low-level signal from its Q output upon rising of a clock. This Low-level signal is output as IRQxREQ of "0" level to the PIC via the OR gate 229.

FIG. 21 shows a logic circuit arranged in an expansion IBRG in the second embodiment to transfer serial interrupt data on a secondary bus to a primary bus.

The expansion IBRG has the following functions.

(1) The expansion IBRG detects the idle cycle of the primary bus to attain synchronization with the secondary bus.

(2) The expansion IBRG transfers serial interrupt data on the secondary bus to the primary bus.

(3) SIRQDT (open-drain output) output from the IBRG rises at high speed (Low High Hi-Z).

A logic for detecting the idle cycle of the primary bus to generate the idle cycle of the secondary bus, and generating a latch pulse of the serial interrupt data on the secondary bus, and a logic for confirming synchronization with the secondary bus are the same as those of the first embodiment.

The operation of a logic circuit shown in FIG. 21 will be described below.

In the first embodiment, the F/F 113 latches sSIRQDTI at the leading edge of each clock, as shown in FIG. 11. In the second embodiment, an output from an exclusive OR (XOR) gate 237 is supplied as a clock signal to the clock input terminal of an F/F 239. In a normal state, i.e., when a clock signal is at Low level, a Low-level signal is input to each input terminal of the XOR 237, and the XOR gate 237 outputs a clock signal of Low level. When the clock rises, a High-level signal is input to the first input terminal of the XOR gate via a delay element 235. For this reason, the first and second inputs of the XOR gate 237 are temporarily set at Low level and High level, respectively. As a result, the XOR gate 237 outputs a High-level signal. After a predetermined period of time (e.g., 15 ns), both the first and second inputs to the XOR gate 237 change to High level, and an output from the XOR gate 237 changes to Low level. Similarly, the first input to the XOR gate 237 is kept at High level with a delay time, while the second input is at Low level. An output from the XOR gate changes to High level. After a predetermined period of time, both the first and second inputs to the XOR gate 237 change to Low level, and an output from the XOR gate 237 changes to Low level.

As a result, a clock signal as shown in FIG. 32C is generated from an original clock signal (pSIRQCK) shown in FIG. 32B, and input to the clock terminal of the F/F 239. The F/F 239 removes one pulse of an input signal (sSIRQDTI) shown in FIG. 23A, and the F/F 241 further removes one pulse. Accordingly, the Q output of the F/F 239 outputs a signal as shown in FIG. 32D, and the F/F 241 outputs a signal as shown in FIG. 32E. Since an original input signal (sSIRQDTI) is synchronized with an original clock signal (pSIRQCK), a signal as shown in FIG. 32A is input. Therefore, the F/F 241 outputs an input signal (sSIRQDTI) with a delay of one clock cycle, compared to the original clock signal, as shown in FIGS. 32A, 32B, and 32E. In this manner, according to the second embodiment, input data changes upon falling of a clock. Clock signals are generated twice, and input signals are latched upon both rising and falling of the clocks.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An interrupt control system for a computer system which comprises a processor, interrupt generation means for generating an interrupt request signal, and an interrupt controller for receiving a plurality of interrupt signals and recognizing pre-assigned functions in units of interrupt signals, comprising:

interrupt encoder means for detecting level transitions of parallel interrupt signals supplied from said interrupt generation means to said processor and converting the interrupt signals into serial data, the interrupt encoder means comprising means for converting the parallel interrupt signals into the serial data by detecting leading edges of the parallel interrupt signals; and means for detecting leading edges of the interrupt signals in synchronism with interrupt decoder means by detecting an idle cycle;

serial transfer means for transferring the serial data; and interrupt decoder means for converting the serial data transferred by said serial transfer means into the parallel interrupt signals, and supplying the parallel interrupt signals to said interrupt controller, the interrupt decoder means comprising means for generating the idle cycle.

2. A system according to claim 1, wherein said interrupt decoder means comprises:

means for generating an idle cycle;

and said interrupt encoder means comprises;

means for generating latch pulses used for said interrupt encoder means to detect the leading edges of the interrupt signals by detecting the idle cycle; and means for detecting the leading edges of the interrupt signals in response to the latch pulses.

3. A system according to claim 1, wherein the idle cycle consists of a cycle for attaining synchronization, and cycles corresponding in number to the interrupt signals, the cycle for attaining synchronization is driven to active level by said interrupt decoder means, and the remaining cycles are driven by said interrupt decoder means to non-active level.

4. A system according to claim 3, wherein said interrupt encoder means comprises means for converting the interrupt signals into serial data by driving to active level the cycles corresponding to the interrupt signals whose leading edges are detected.

5. A system according to claim 1, wherein said interrupt decoder means comprises means which are arranged in correspondence with the number of the interrupt signals, and independently detect the leading edges in units of interrupt signals.

6. A system according to claim 1, wherein said interrupt decoder means comprises:

means for generating an internal interrupt request signal to said interrupt controller on the basis of leading edge information supplied from said interrupt encoder means; and means for canceling the internal interrupt request signal in synchronism with a timing at which said interrupt controller latches the internal interrupt request signal.

7. A system according to claim 1, wherein said serial transfer means comprises a clock signal line and a serial data line.

8. A system according to claim 1, wherein said serial transfer means comprises a bus consisting of a serial clock line and a serial data line, and a plurality of said interrupt encoder means are connected to the bus.

9. An interrupt control system for a computer system which comprises a processor, interrupt generation means for generating an interrupt request signal, and an interrupt controller for receiving a plurality of interrupt signals and recognizing pre-assigned functions in units of interrupt signals, comprising:

interrupt encoder means for detecting leading edges and trailing edges of parallel interrupt signals supplied from said interrupt generation means to said processor and converting the interrupt signals into serial data, the interrupt encoder means comprising means for detecting the leading edges and the trailing edges of the interrupt signals in synchronism with interrupt decoder means by detecting an idle cycle;

serial transfer means for transferring the serial data; and interrupt decoder means for converting the serial data transferred by said serial transfer means into the parallel interrupt signals, and supplying the parallel interrupt signals to said interrupt controller, the interrupt decoder means comprising means for generating the idle cycle.

10. A system according to claim 9, wherein said interrupt decoder means comprises means for generating an idle cycle;

and said interrupt encoder means comprises;

means for generating latch pulses used for said interrupt encoder means to detect the leading edges of the interrupt signals by detecting the idle cycle; and means for detecting the leading edges and the trailing edges of the interrupt signals in response to the latch pulses.

11. A system according to claim 9, wherein the idle cycle consists of a cycle for attaining synchronization, and cycles corresponding in number to the interrupt signals, the cycle for attaining synchronization is driven to active level by said interrupt decoder means, and the remaining cycles are driven by said interrupt decoder means to non-active level.

12. A system according to claim 9, wherein said interrupt encoder means comprises means for converting the interrupt signals into serial data by driving to active level the cycles corresponding to the interrupt signals whose leading edges and trailing edges are detected.

13. A system according to claim 9, wherein said interrupt decoder means comprises means which are arranged in correspondence with the number of the interrupt signals, and independently detect the leading edges and the trailing edges in units of interrupt signals.

14. A system according to claim 9, wherein said interrupt decoder means comprises:

means for generating an internal interrupt request signal to said interrupt controller on the basis of leading edge information and trailing edge information supplied from said interrupt encoder means; and means for canceling the internal interrupt request signal in synchronism with a timing at which said interrupt controller latches the internal interrupt request signal.

15. A system according to claim 9, wherein said serial transfer means comprises a clock signal line and a serial data line.

16. A system according to claim 9, wherein said serial transfer means comprises a bus consisting of a serial clock line and a serial data line, and a plurality of said interrupt encoder means are connected to the bus.

17. An interrupt control system for a computer system which comprises a processor, interrupt generation means for generating an interrupt request signal, and an interrupt controller for receiving a plurality of interrupt signals and recognizing pre-assigned functions in units of interrupt signals, comprising:

interrupt encoder means for detecting at least one of a leading edge, a trailing edge, and a level of each of parallel interrupt signals supplied from said interrupt generation means to said processor and converting the interrupt signals into serial data, the interrupt encoder means comprising means for detecting at least one of the leading edge, the trailing edge, and the level of each of the interrupt signals in synchronism with interrupt decode means by detecting an idle cycle;

serial transfer means for transferring the serial data; and interrupt decoder means for converting the serial data transferred by said serial transfer means into the parallel interrupt signals to said interrupt controller, the interrupt decoder means comprising means for generating the idle cycle.

18. A system according to claim 17, wherein said interrupt decoder means comprises means for generating an idle cycle;

and said interrupt encoder means comprises;

means for generating latch pulses used for said interrupt encoder means to detect the leading edges of the interrupt signals by detecting the idle cycle; and means for detecting at least one of the leading edge, the trailing edge, and the level of each of the interrupt signals in response to the latch pulses.

19. A system according to claim 17, wherein the idle cycle consists of a cycle for attaining synchronization, and cycles corresponding in number to the interrupt signals, the cycle for attaining synchronization is driven to active level by said interrupt decoder means, and the remaining cycles are driven by said interrupt-decoder means to non-active level.

20. A system according to claim 19, wherein said interrupt encoder means comprises means for converting the interrupt signals into serial data by driving to active level the cycles corresponding to the interrupt signals each in which at least one of the leading edge, the trailing edge, and the level is detected.

21. A system according to claim 17, wherein said interrupt decoder means comprises means which are arranged in correspondence with the number of the interrupt signals, and independently detect at least one of the leading edge, the trailing edge, and the level in units of interrupt signals.

22. A system according to claim 17, wherein said interrupt decoder means comprises:
   means for generating an internal interrupt request signal to said interrupt controller on the basis of at least one of leading edge information, trailing edge information, and level information supplied from said interrupt encoder means; and
   means for canceling the internal interrupt request signal in synchronism with a timing at which said interrupt controller latches the internal interrupt request signal.

23. A system according to claim 17, wherein said serial transfer means comprises a clock signal line and a serial data line.

24. A system according to claim 17, wherein said interrupt encoder means and said interrupt decoder means comprise means for selecting an edge mode or a level mode in units of interrupt signals.

25. A system according to claim 17, wherein said interrupt encoder means comprises means for distinguishing a High period of a clock signal from a Low period of the clock signal, and converting the leading edges, the trailing edges, and the levels of the interrupt signals by driving the serial data to High or Low in correspondence with the High or Low period.

26. An interrupt control system for a computer system which comprises a processor, interrupt generation means for generating an interrupt request signal, and an interrupt controller for receiving a plurality of interrupt signals and recognizing pre-assigned functions in units of interrupt signals, comprising:
   interrupt encoder means for detecting level transitions of parallel interrupt signals supplied from said interrupt generation means to said processor and converting the interrupt signals into serial data;
   first serial transfer means for transferring the serial data;
   interrupt decoder means for converting the serial data transferred by said first serial transfer means into the parallel interrupt signals, and supplying the parallel interrupt signals to said interrupt controller, the interrupt decoder means comprising means for generating an idle cycle of said first serial transfer means;
   an expansion device which is connected to said computer system and generates an interrupt signal; second serial transfer means for transferring serial data corresponding to the interrupt signal output from said expansion device to said interrupt decoder means; and
   bus bridge control means for relaying between said first and second serial transfer means, including relaying the serial data transferred via said second serial transfer means to said first serial transfer means, the bus bridge control means comprising means for generating an idle cycle earlier by a predetermined number of cycles than the idle cycle of said first serial transfer means on the basis of the idle cycle of said first serial transfer means, and outputting the generated idle cycle to said second serial transfer means.

27. A system according to claim 26, wherein said serial transfer means comprises a bus consisting of a serial clock line and a serial data line, and a plurality of said interrupt encoder means are connected to the bus.

28. A system according to claim 26, further comprising a local bus connected to said interrupt controller and an external bus connected to said expansion device, and wherein said first serial transfer means for transferring the serial data from said interrupt encoder means to said interrupt decoder means comprises a first special-purpose serial signal line independent from said local bus, said second transfer means for transferring the serial data from said expansion device to said interrupt decoder means comprises a second special-purpose serial line independent from said external bus, and said bus bridge means has a relay function of relaying between said first and second special-purpose serial lines.

29. A system according to claim 28, wherein said serial transfer means comprises a bus consisting of a serial clock line and a serial data line, and a plurality of said interrupt encoder means are connected to the bus.

30. An interrupt control system for a computer system which comprises a processor, interrupt generation means for generating an interrupt request signal, and an interrupt controller for receiving a plurality of interrupt signals and recognizing pre-assigned functions in units of interrupt signals, comprising:
   interrupt encoder means for detecting leading edges and trailing edges of parallel interrupt signals supplied from said interrupt generation means to said processor and converting the interrupt signals into serial data;
   first serial transfer means for transferring the serial data;
   interrupt decoder means for converting the serial data transferred by said first serial transfer means into the parallel interrupt signals, and supplying the parallel interrupt signals to said interrupt controller;
   an expansion device which is connected to said computer system and generates an interrupt signal;
   second serial transfer means for transferring serial data corresponding to the interrupt signal output from said expansion device to said interrupt decoder means; and
   bus bridge control means for relaying between said first and second serial transfer means, including relaying the serial data transferred via said second serial transfer means to said first serial transfer means, the bus bridge control means comprising means for generating an idle cycle earlier than the idle cycle of said first serial transfer means on the basis of the idle cycle of said first serial transfer means, and outputting the generated idle cycle to said second serial transfer means.

31. A system according to claim 30, wherein said serial transfer means comprises a bus consisting of a serial clock line and a serial data line, and a plurality of said interrupt encoder means are connected to the bus.

32. A system according to claim 30, further comprising a local bus connected to said interrupt controller and an external bus connected to said expansion device, and wherein said first serial transfer means for transferring the serial data from said interrupt encoder means to said interrupt decoder means comprises a first special-purpose serial signal line independent from said local bus, said second transfer means for transferring the serial data from said expansion device to said interrupt decoder means comprises a second special-purpose serial line independent from said external bus, and said bus bridge means has a relay function of relaying between said first and second special-purpose serial lines.

33. A system according to claim 32, wherein said serial transfer means comprises a bus consisting of a serial clock line and a serial data line, and a plurality of said interrupt encoder means are connected to the bus.

34. An interrupt control system for a computer system which comprises a processor, interrupt generation means for generating an interrupt request signal, and an interrupt controller for receiving a plurality of interrupt signals and recognizing pre-assigned functions in units of interrupt signals, comprising:

interrupt encoder means for detecting at least one of a leading edge, a trailing edge, and a level of each of parallel interrupt signals supplied from said interrupt generation means to said processor and converting the interrupt signals into serial data;

first serial transfer means for transferring the serial data;

interrupt decoder means for converting the serial data transferred by said first serial transfer means into the parallel interrupt signals, and supplying the parallel interrupt signals to said interrupt controller, the interrupt decoder means comprising means for generating an idle cycle of said first serial transfer means;

an expansion device which is connected to said computer system and generates an interrupt signal;

second serial transfer means for transferring serial data corresponding to the interrupt signal output from said expansion device to said interrupt decoder means; and bus bridge control means for relaying between said first and second serial transfer means, including relaying the serial data transferred via said second serial transfer means to said first serial transfer means, the bus bridge control means comprising means for generating an idle cycle earlier by a predetermined number of cycles than the idle cycle of said first serial transfer means on the basis of the idle cycle of said first serial transfer means, and outputting the generated idle cycle to said second serial transfer means.

35. A system according to claim 34, wherein said interrupt encoder means and said interrupt decoder means comprise means for selecting an edge mode or a level mode in units of interrupt signals.

36. A system according to claim 34, wherein said interrupt encoder means comprises means for distinguishing a High period of a clock signal from a Low period of the clock signal, and converting the leading edges, the trailing edges, and the levels of the interrupt signals by driving the serial data to High or Low in correspondence with the High or Low period.

37. A system according to claim 34, wherein said serial transfer means comprises a bus consisting of a serial clock line and a serial data line, and a plurality of said interrupt encoder means are connected to the bus.

38. A system according to claim 34, further comprising a local bus connected to said interrupt controller and an external bus connected to said expansion device, and wherein said first serial transfer means for transferring the serial data from said interrupt encoder means to said interrupt decoder means comprises a first special-purpose serial signal line independent from said local bus, said second transfer means for transferring the serial data from said expansion device to said interrupt decoder means comprises a second special-purpose serial line independent from said external bus, and said bus bridge means has a relay function of relaying between said first and second special-purpose serial lines.

39. A system according to claim 38, wherein said interrupt encoder means and said interrupt decoder means comprise means for selecting an edge mode or a level mode in units of interrupt signals.

40. A system according to claim 38, wherein said interrupt encoder means comprises means for distinguishing a high period of a clock signal from a low period of the clock signal, and converting the leading edges, the trailing edges, and the levels of the interrupt signals by driving the serial data to high or low in correspondence with the high or low period.

41. A system according to claim 38, wherein said serial transfer means comprises a bus consisting of a serial clock line and a serial data line, and a plurality of said interrupt encoder means are connected to the bus.

* * * * *